(12) United States Patent
Yanagihara et al.

(10) Patent No.: US 7,882,168 B2
(45) Date of Patent: Feb. 1, 2011

(54) CONTENTS DISTRIBUTION SYSTEM, NODE APPARATUS AND INFORMATION PROCESSING METHOD THEREOF, AS WELL AS RECORDING MEDIUM ON WHICH PROGRAM THEREOF IS RECORDED

(75) Inventors: Yasushi Yanagihara, Nagoya (JP); Hiroaki Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 259 days.

(21) Appl. No.: 12/219,067

(22) Filed: Jul. 15, 2008

(65) Prior Publication Data
US 2008/0281982 A1    Nov. 13, 2008

Related U.S. Application Data

(63) Continuation-in-part of application No. PCT/JP2007/050043, filed on Jan. 5, 2007.

(30) Foreign Application Priority Data
Jan. 20, 2006    (JP)    ............................... 2006-011889

(51) Int. Cl.
*G06F 15/16*    (2006.01)
(52) U.S. Cl. .................. 709/201; 709/203; 709/219
(58) Field of Classification Search ................ 709/201, 709/203, 219, 223, 224, 225
See application file for complete search history.

(56) References Cited

U.S. PATENT DOCUMENTS 5,802,316 A * 9/1998 Ito et al. ..................... 709/249

(Continued)

FOREIGN PATENT DOCUMENTS

JP    A-11-88396    3/1999

(Continued)

OTHER PUBLICATIONS

Oka et al., "Lightweight Load Balancing for Distributed Hash Tables", Institute of Electronics, Information and Communication Engineers, Communications Technology IN2003-189, Feb. 2004.

(Continued)

*Primary Examiner*—Joseph E Avellino
*Assistant Examiner*—Jeong S Park
(74) *Attorney, Agent, or Firm*—Oliff & Berridge PLC

(57) ABSTRACT

To provide a contents distribution system, method and the like, wherein even a node apparatus with a small storage capacity, such as in the case of a set-top box, can function as a root node apparatus in a P2P type of contents distribution system having a plurality of node apparatus disposed dispersed in a network by a DHT (Distributed Hash Table), or the like. A node apparatus includes a distribution source information storage section having a management information storage area storing first position information, which is position information of a management subject contents holding node apparatus holding contents data which are a subject of management, and an extension management information storage area storing second position information, which is position information of a node apparatus holding position information of the management subject contents holding node apparatus. Then, in the event that it is determined that a message received via a network is a request addressed to the node apparatus itself for a transmission of contents data distribution source information, the node apparatus selects the first position information or the second position information from the distribution source information storage section.

13 Claims, 20 Drawing Sheets

U.S. PATENT DOCUMENTS

| | | | |
|---|---|---|---|
| 6,038,236 A * | 3/2000 | Houjou et al. | 370/465 |
| 6,044,076 A * | 3/2000 | Yamamoto | 370/392 |
| 6,175,874 B1 * | 1/2001 | Imai et al. | 709/238 |
| 7,073,025 B2 | 7/2006 | Okamoto et al. | |
| 7,450,580 B2 * | 11/2008 | Itonaga et al. | 370/392 |
| 7,697,930 B2 * | 4/2010 | Miao et al. | 455/432.1 |
| 2002/0114286 A1 | 8/2002 | Iwamura et al. | |
| 2004/0044698 A1 | 3/2004 | Ebata et al. | |
| 2004/0172423 A1 | 9/2004 | Kaasten et al. | |
| 2005/0091333 A1 * | 4/2005 | Kobayashi et al. | 709/212 |
| 2007/0297422 A1 * | 12/2007 | Matsuo et al. | 370/400 |

FOREIGN PATENT DOCUMENTS

| | | |
|---|---|---|
| JP | A-2003-99337 | 4/2003 |
| JP | A-2003-216521 | 7/2003 |
| JP | A-2004-265418 | 9/2004 |
| JP | A-2005-38368 | 2/2005 |
| JP | A-2005-251042 | 9/2005 |
| JP | A-2005-258942 | 9/2005 |
| WO | WO 2006/075424 A1 | 7/2006 |

OTHER PUBLICATIONS

Takemoto et al., "Load Balancing Schemes for Dynamic System Configuration in Content-Addressable Network", Institute of Electronics, Information and Communication Engineers, pp. 13-18, 2003.

Yoshida et al., "Dynamic Optimization of Peer-to-Peer Systems by Autonomous Index-Server Formation", B vol. J86-B, No. 8, pp. 1445-1453, 2003.

* cited by examiner

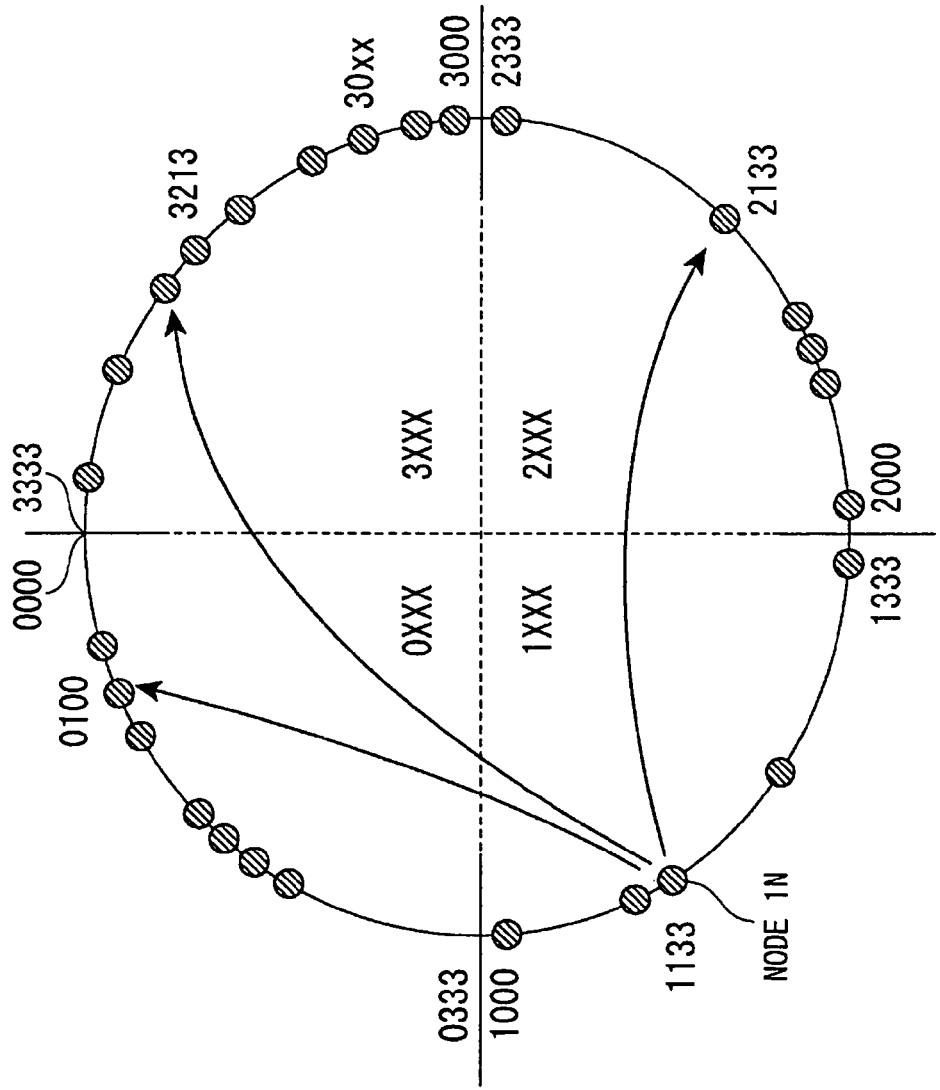

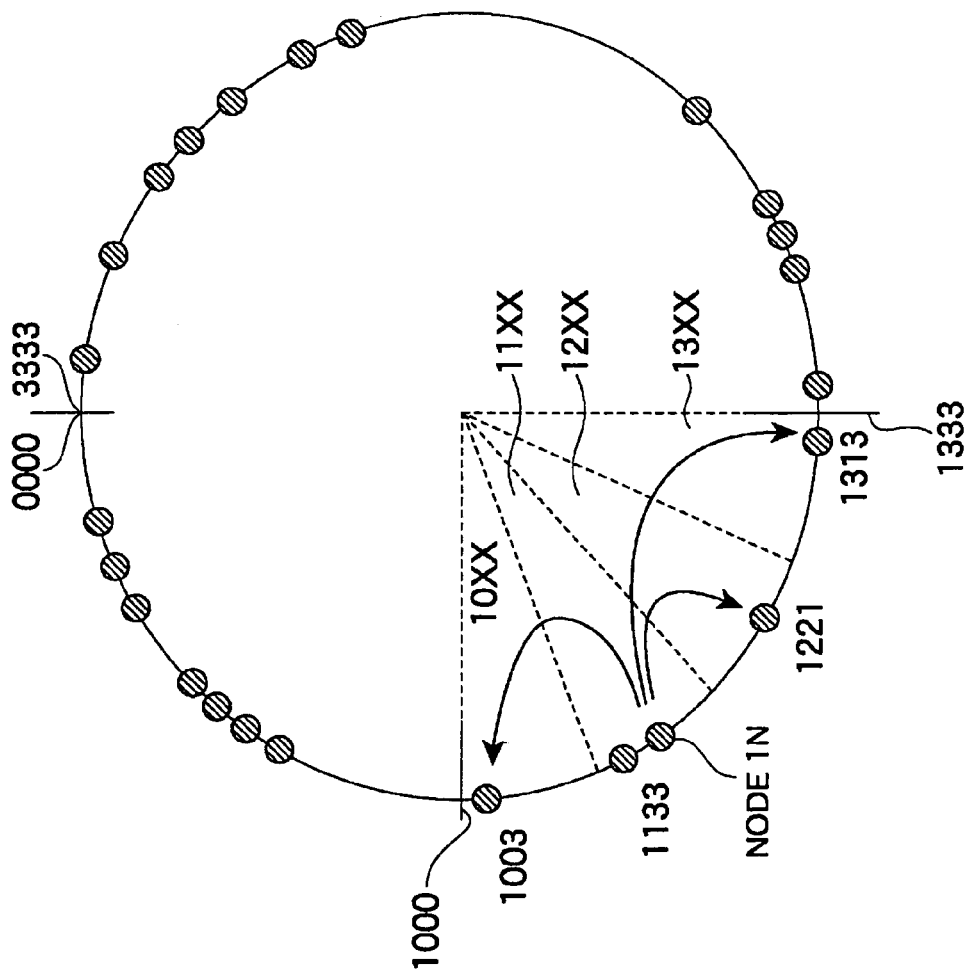

Fig. 4

| PREFIX | | -0- | -1- | -2- | -3- |
|---|---|---|---|---|---|
| LEVEL 1 | NODE ID | 0100 | 1133 | 2133 | 3213 |
| | IP ADDRESS | 10.123.20.73 | | 51.10.20.13 | 41.120.10.23 |
| LEVEL 2 | NODE ID | 1003 | (11xx) | 1221 | 1313 |
| | IP ADDRESS | 21.10.210.13 | | 21.13.21.13 | 11.130.20.143 |
| LEVEL 3 | NODE ID | 1103 | 1110 | 1122 | (113x) |
| | IP ADDRESS | 41.10.217.3 | 111.12.20.1 | 61.11.20.13 | |
| LEVEL 4 | NODE ID | 1130 | 1131 | 1132 | (1133) |
| | IP ADDRESS | 121.150.10.13 | 216.11.210.11 | 210.10.10.13 | |

Fig. 7

| | CONTENTS ID | POSITION INFORMATION | FLAG | STREAMING TIME | INTRODUCTION TIME | |
|---|---|---|---|---|---|---|
| 0 | 3020 | 60.32.72.101 | Direct | 7200 | 11/04 11:32.110 | (A) |
| 1 | 3020 | 221.172.2.21 | Direct | 7200 | 11/04 11:33.010 | (A) |
| 2 | 3020 | 61.15.12.1 | Direct | 7200 | 11/04 11:35.090 | (A) |
| 3 | 3020 | 60.32.72.103 | Direct | 7200 | 11/04 11:36.000 | (A) |
| 4 | 3020 | 192.168.0.21 | Direct | 7200 | 11/04 11:36.310 | (A) |
| 5 | 3020 | 221.173.2.22 | Direct | 7200 | 11/04 11:37.240 | (A) |
| 6 | 3020 | 152.105.11.123 | Direct | 7200 | 11/04 11:38.391 | (A) |
| 7 | 3020 | 32.125.12.1 | Direct | 7200 | 11/04 11:40.110 | (A) |
| 8 | 3020 | 60.32.72.104 | Direct | 7200 | 11/04 11:41.220 | (A) |
| 9 | 3020 | 221.171.12.2 | Direct | 7200 | 11/04 11:41.345 | (A) |
| 10 | 3020 | 60.32.72.107 | Direct | 7200 | 11/04 11:41.450 | (A) |
| 11 | 3020 | 192.168.12.2 | Direct | 7200 | 11/04 11:42.010 | (A) |
| 12 | 3020 | 61.15.12.5 | Direct | 7200 | 11/04 11:42.110 | (A) |
| 13 | 3020 | 152.105.21.123 | Direct | 7200 | 11/04 11:42.533 | (A) |
| 14 | 3020 | 60.32.72.111 | Extenasion | — | — | (B) |
| 15 | 3020 | 221.173.2.11 | Extension | — | — | (B) |
| 16 | 2110 | 61.15.12.6 | Direct | 9000 | 11/04 10:02.010 | (C) |
| 17 | 2110 | 192.168.0.27 | Direct | 9000 | 11/04 10:12.210 | (C) |
| 18 | 0130 | 121.143.2.11 | Direct | 6300 | 11/04 09:12.380 | (C) |
| 19 | 2110 | 231.171.23.1 | Extension | — | — | (D) |

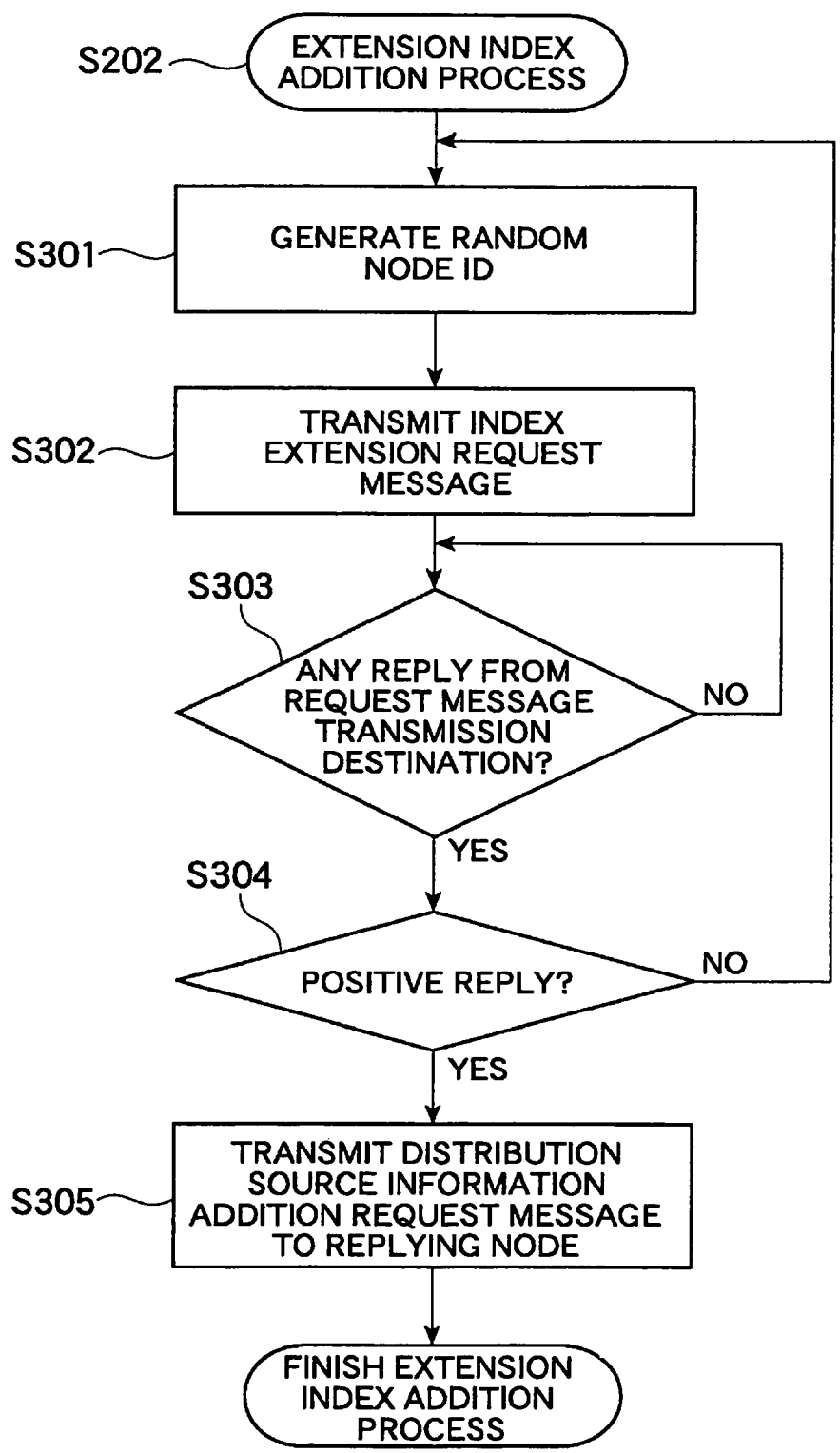

CONTENTS DISTRIBUTION SYSTEM, NODE APPARATUS AND INFORMATION PROCESSING METHOD THEREOF, AS WELL AS RECORDING MEDIUM ON WHICH PROGRAM THEREOF IS RECORDED

CROSS-REFERENCE TO RELATED APPLICATION(S)

The present application is a Continuation-in-Part of International Application No. PCT/JP2007/50043 filed on Jan. 5, 2007, which claims the benefit of Japanese Patent Application No. 2006-011889 filed on Jan. 20, 2006.

BACKGROUND OF THE INVENTION

1. Field of the Invention

The present invention belonging to a contents distribution technical field, more particularly, relates to a contents distribution system which, being configured of a plurality of node apparatus disposed dispersed in a network, carries out a transmission and reception of contents data among the node apparatus, the node apparatus, and an information processing method thereof, as well as a recording medium on which a program thereof is recorded.

2. Description of the Related Art

In recent years, a so-called contents distribution system, which distributes contents data such as music, a movie, or a talk program (hereafter also called "contents"), via a network such as an internet, has been an active area of research.

As a basic configuration of the heretofore known contents distribution system, there is a server-client type of distribution system. The server-client type of distribution system is of a configuration wherein a terminal apparatus, which is a client, accesses a server which accumulates contents, and receives a distribution of the contents.

However, with this kind of distribution system, there is a disadvantage in that accesses from terminal apparatus concentrate in a server apparatus which has specific popular contents, making it difficult to obtain, and view or listen to, desired contents without stress and at a high quality, in terminal apparatus of a plurality of users desiring a distribution of the contents.

Therein, a technology has been proposed for efficiently distributing and disposing information, achieving a load distribution, by logically constructing an overlay network using a distributed hash table (DHT).

In this system, each node apparatus which is a terminal apparatus, rather than recognizing link information (for example, an IP address) for all node apparatus participating in the overlay network, holds only link information for one portion of the node apparatus acquired when participating, or the like, and makes an inquiry, or the like, for data, based on such link information.

It being necessary, in the overlay network, that the load distribution is appropriately carried out even in the event that a participation and withdrawal (leaving) of the node apparatus take place frequently, a technology for appropriately carrying out the load distribution in the overlay network, even in the event that the participation and withdrawal (leaving) of the node apparatus take place frequently, is disclosed in non-patent document 1: "Discussion of Distributed Hash Table Light Load Distribution Method", Institute of Electronics, Information and Communication Engineers, Communications Technology IN2003-189, February, 2004.

SUMMARY OF THE INVENTION

In a peer-to-peer type of contents distribution system, wherein the technology of non-patent document 1 is used in a contents distribution system, each node apparatus becomes a contents distribution server holding contents data, and each node apparatus also becomes a contents distribution requesting client.

Also, in this kind of contents distribution system, it is known not only that a node apparatus which is a contents distribution server is holding contents data, but also that another node apparatus in the network is holding a replica of the contents data. Hereafter, a node apparatus which is holding a replica of the contents data will also be referred to as a contents holding node apparatus. A node apparatus which is a contents distribution requesting client (hereafter called a "request node apparatus") can also obtain required contents from this kind of contents holding node apparatus. Consequently, in a case in which requests for a distribution of certain contents increase, as it is possible to distribute the contents not only from the node apparatus which is the contents distribution server, but also from a contents holding node apparatus holding a replica thereof, it is possible to avoid a concentration of accesses in the node apparatus which is the contents distribution server. Hereafter, the contents distribution server will be included when referring to the contents holding node apparatus.

In the heretofore described peer-to-peer type of contents distribution system, a configuration is such that, a node apparatus which stores position information of a plurality of contents holding node apparatus (hereafter called a "root node apparatus") being decided on, by requesting the root node apparatus for position information of a contents holding node apparatus holding contents required by a request node apparatus (hereafter called "index information"), the index information is acquired, and a request for a distribution of the contents data is made to the contents holding node apparatus, based on the index information.

However, in a case in which the node apparatus decided on as the root node apparatus is an apparatus with a severe restriction on a storage capacity, such as a set-top box, a limit arises to index information which can be stored. In particular, there is a large problem in a case of becoming a root node apparatus relating to popular contents.

That is, although it is necessary, in the case of popular contents, to store position information of a number of contents holding node apparatus which can cope with accesses from a large number of request node apparatus, it is difficult to hold the position information of a large number of contents holding node apparatus in the case of a root node apparatus relating to popular contents.

As a result, a number of contents holding node apparatus which can be simultaneously introduced in response to accesses from a large number of request node apparatus being limited, any access beyond that number is responded to with "request refused" or "request on hold". In a case of this kind of condition arising, a user of the request node apparatus will be made to feel annoyed. That is, in a case in which there is a limit to a number of items of position information of contents holding node apparatus which can be stored, a problem occurs in that it is not possible to introduce sufficient contents holding node apparatus to cope with the contents distribution requests.

The invention, being contrived with the heretofore described disadvantage in mind, has an object of providing a contents distribution system, method and the like, wherein even a node apparatus with a small storage capacity, such as in the case of a set-top box, can function as a root node apparatus in a P2P type of contents distribution system having a plurality of node apparatus disposed dispersed in a network.

According to an embodiment of the present invention, there is provided a node apparatus in a contents distribution system which, being configured of a plurality of node apparatus disposed dispersed in a network, carries out a transmission and reception of contents data among the node apparatus, the node apparatus including: a routing table storage section which stores a routing table in which are correlated identification information and position information of one portion of node apparatus among the plurality of node apparatus; a message destination determination section which, based on destination identification information of a message received via the network and on the routing table, determines whether or not the message received is addressed to its own node apparatus; a message forwarding section which, in the event that it is determined by the message destination determination section that a message received via the network is not addressed to its own node apparatus, based on the destination identification information of the message received, retrieves the position information of a forwarding destination node apparatus from the routing table, and forwards the message received to the forwarding destination node apparatus; a distribution source information storage section which has a management information storage area storing first position information, which is position information of a management subject contents holding node apparatus which holds contents data which are a subject of management in its own node apparatus, and an extended management information storage area storing second position information, which is position information of a node apparatus holding the position information of the management subject contents holding node apparatus; a distribution source information selection section which, in the event that it is determined by the message destination determination section that a message received via the network is addressed to its own node apparatus, and that it is a request for a transmission of contents data distribution source information, selects either the first position information or the second position information from the distribution source information storage section; a contents data distribution source information return section which, when the first position information is selected by the distribution source information selection section, returns the first position information to a node apparatus which has requested the contents data distribution source information, via the network; and a contents data distribution source information transmission request forwarding section which, when the second position information is selected by the distribution source information selection section, forwards a request, via the network, to transmit the contents data distribution source information to a node apparatus of the second position information.

BRIEF DESCRIPTION OF THE DRAWINGS

FIG. 3A is a diagram showing one example of an aspect of a routing table being compiled by DHT;

FIG. 3B is a diagram showing one example of an aspect of the routing table being compiled by DHT;

FIG. 4 is one example of the routing table of the node apparatus according to the embodiment;

FIG. 7 is one example of an index table of the node apparatus according to the embodiment;

FIG. 18 is a flowchart showing an index extension process in the node apparatus.

DESCRIPTION OF THE PREFERRED EMBODIMENT(S)

Hereafter, a description will be given, based on the drawings, of a preferred embodiment of the invention. The embodiment to be described hereafter is an embodiment of a case in which the invention is applied to a contents distribution system, which has contents data such as music data and movie data as information to be distributed.

1. Configuration and the like of Contents Distribution System

Figure 1:
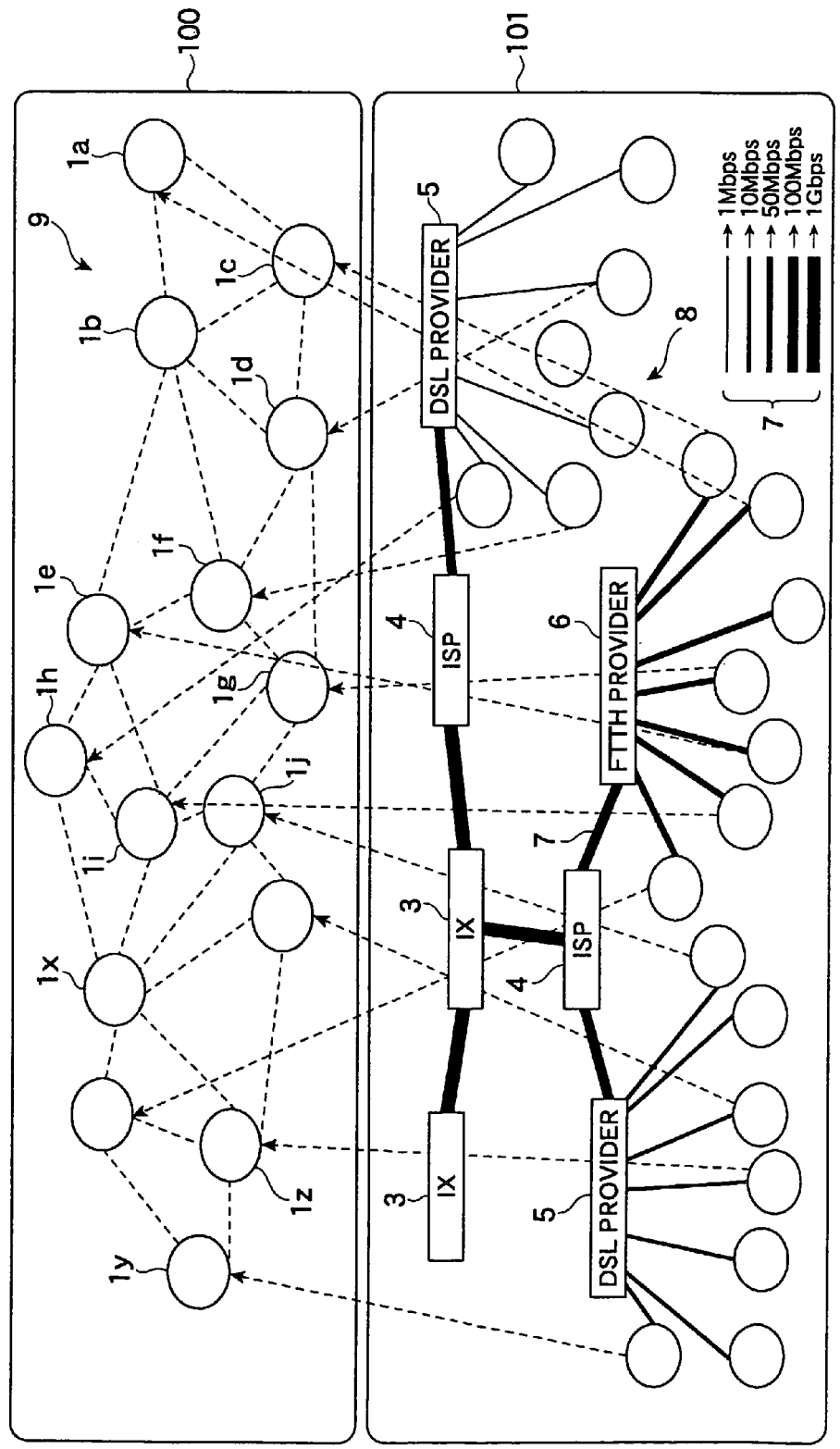
FIG. 1 is a diagram showing one example of a connection aspect of each node apparatus in a contents distribution system according to an embodiment.

Firstly, a description will be given of an outline configuration and the like of a contents distribution system as an information distribution system, referring to FIG. 1. FIG. 1 is a diagram showing one example of a connection aspect of each node apparatus in the contents distribution system according to the embodiment. The contents distribution system, being configured of a plurality of node apparatus disposed dispersed on a network, carries out a transmission and reception of contents data between the node apparatus.

As shown within a lower frame 101 of FIG. 1, a network (a network in the actual world) 8, such as an internet, is constructed of an IX (Internet exchange) 3, an ISP (Internet Service Provider) 4, a DSL (Digital Subscriber Line) provider (a device thereof) 5, an FTTH (Fiber To The Home) provider (a device thereof) 6, and a communication line 7 (for example, a telephone line, an optical cable, or the like). A device of an RADSL (Rate adaptive Asymmetric Digital Subscriber Line) is also included in the device of the DSL provider.

As shown within an upper frame 100 of FIG. 1, a contents distribution system S, being configured including a plurality of node apparatus 1a, 1b, 1c . . . 1x, 1y, 1z . . . mutually connected via the network 8, is a peer-to-peer (P2P) type of network system. A unique manufacturing number (for example, a MAC address) and IP (Internet Protocol) address (position information in the invention) are allotted, as information indicating a node apparatus, to each node apparatus 1a, 1b, 1c . . . 1x, 1y, 1z . . . . The manufacturing number and IP address are not duplicated among the plurality of node apparatus 1. Also, in the following description, in a case of indicating any one node apparatus among the node apparatus 1a, 1b, 1c . . . 1x, 1y, 1z . . . , it may be referred to as the node apparatus 1, for the sake of convenience.

1.1. DHT Outline

Hereafter, a description will be given of an algorithm using a distributed hash table (hereafter called a "DHT") according to the embodiment.

In the heretofore described contents distribution system S, when the node apparatus 1 exchange information with each other, they have to know each other's IP address, which acts as the position information.

For example, in a system in which contents are shared, although each node apparatus 1 participating in the network 8 knows the IP addresses of all other node apparatus 1 participating in the network 8 by a simple method, in the event that a number of node apparatus 1 rises to several tens of thousands, or several hundreds of thousands, it is not realistic to attempt to remember the IP addresses of all the node apparatus 1. Also, in the event that power of a given node apparatus 1 is frequently turned on or off, the IP address of the given node apparatus 1 stored in each node apparatus 1 being updated frequently, operation becomes difficult.

Therein, a system is being considered whereby only the IP addresses of a minimally necessary portion of node apparatus 1, among all the node apparatus 1 participating in the network 8, being stored in one node apparatus 1, regarding node apparatus 1 of which the IP addresses are not stored, contents are delivered by forwarding information amongst the node apparatus 1.

As one example of this kind of system, a kind of overlay network 9 shown within the upper frame 100 of FIG. 1 is constructed by the algorithm using the DHT. That is, the overlay network 9 refers to a network configuring a virtual link formed using the already existing network 8.

In the embodiment, with the overlay network 9 constructed by the algorithm using the DHT as a precondition, node apparatus 1 disposed on the overlay network 9 are referred to as node apparatus 1 participating in the contents distribution system S (in other words, participating in the overlay network 9). The participation in the contents distribution system S is effected by a node apparatus which is not yet participating sending a participation request to an optional node apparatus 1 which is already participating.

A unique number is given to each node apparatus 1 as an identification number (hereafter called a "node ID") of each node apparatus 1 participating in the contents distribution system S. It is necessary to give this number a number of bits equivalent to a maximum operational number of node apparatus which can be accommodated. For example, in a case of a number of 128 bits, it is possible to operate $2^{128}=340 \times 10^{36}$ node apparatus.

More specifically, the node ID's of each node apparatus 1, being hash values obtained by hashing a value unique to each node apparatus 1, such as the IP address or manufacturing number of each node apparatus 1, with a common hash function (a hash algorithm), are disposed, distributed without bias, in one ID space. As long as the relevant IP address or manufacturing number differs, a probability of node ID obtained by hashing with the common hash function in this way having the same value is extremely low. As the hash function is public knowledge, a detailed description will be omitted. Also, in the embodiment, a value of the IP address (a global IP address) hashed with the common hash function will be taken as the node ID.

Also, in the plurality of node apparatus 1 participating in the contents distribution system S, although contents data (for example, music data, movie data, document data, or the like), as common information distributed from one node apparatus 1 to other node apparatus 1, are stored distributed, an identification number (hereafter called a "contents ID"), unique to each item of contents data, is given to the contents data too.

Then, the contents ID is made the same length as the node ID (for example, 128 bits, or the like) and, for example, a keyword such as a contents name (a contents title) or contents outline information (a summary) is hashed with a hash function common to that used when acquiring the node ID (that is, it is disposed in the same ID space as the hash value of the node apparatus 1 IP address), and a node apparatus 1 which has a node ID nearest to (for example, most leading digits match) the hash value holds information linking to a node apparatus 1 holding the contents data (hereafter called a "contents holding node apparatus"), that is, it holds an IP address which is position information of the contents holding node apparatus. The contents holding node apparatus is decided under a certain rule (for example, under a rule by which a root node apparatus makes a random selection). By this means, the contents data are disposed, distributed without bias, in the contents distribution system S. It can be supposed that it may happen that, even though the contents data differ, the keyword (for example, the contents name) is identical but, in this case, as the hash value is the same, it is advisable to make the keyword to be hashed, for example, a combination of the contents name and copyright information (for example, a performer's name, a director's name, an author's name, a singer's name, a composer's name, a lyricist's name or the like) in order to avoid this.

Figure 2:
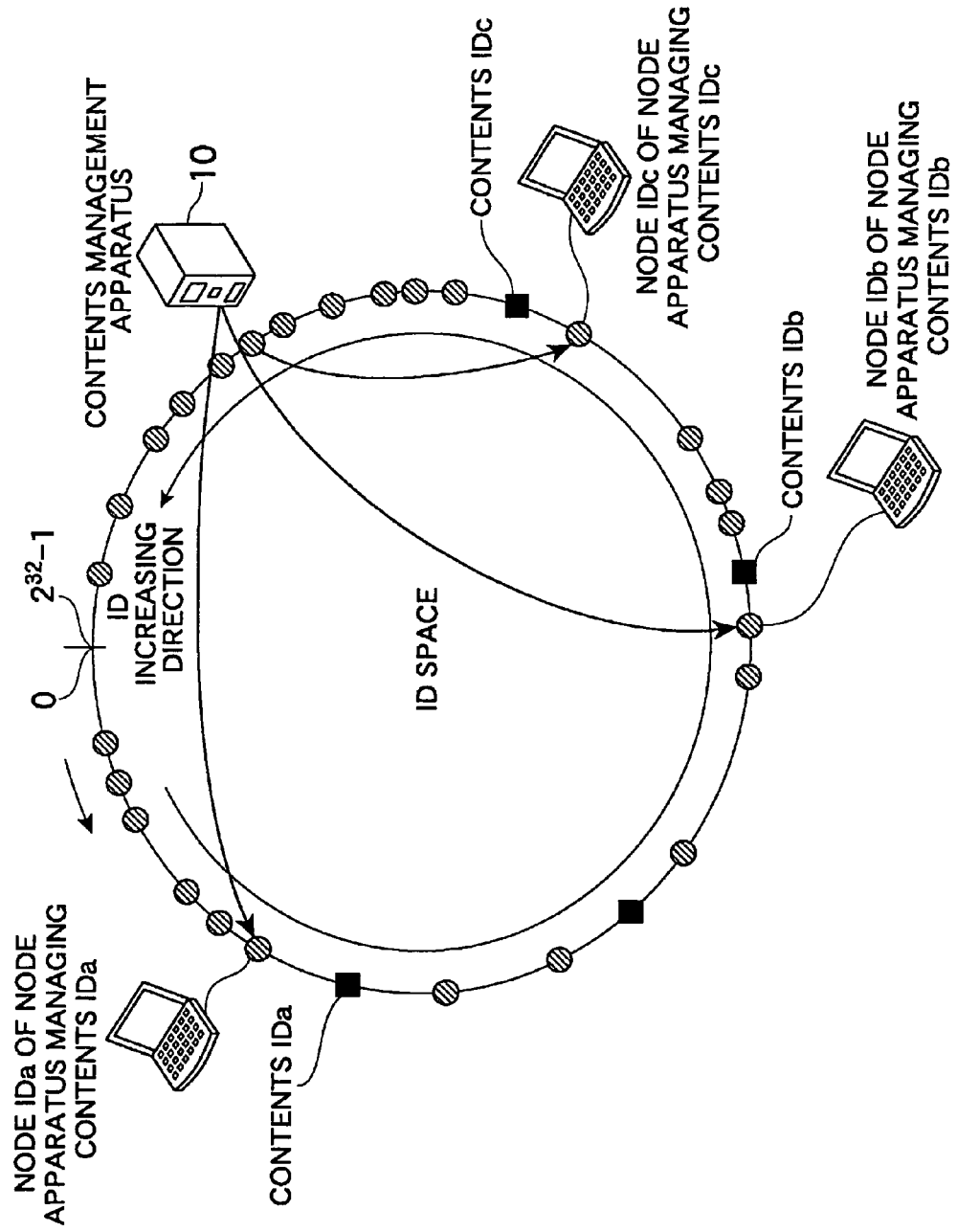
FIG. 2 is an illustration of an ID space.

In this way, as the node ID and contents ID, given respectively to each node apparatus 1 and each item of contents data, are generated by the common hash function, it is possible to think of them existing scattered, with no particular bias, in one ring-shaped ID space, as shown in FIG. 2. The figure illustrates the node ID and contents ID given at 32 bits. In the figure, round marks indicate the node ID, and squares the contents ID, and the ID increase in a counter-clockwise direction.

Next, it is decided, under a certain rule, which contents data are held in which node apparatus 1. In the embodiment, a rule is applied to the effect that "a node apparatus 1 managing contents data which have a certain contents ID is a node apparatus 1 which has a node ID near the contents ID". Herein, a definition of "near" is that, without exceeding the contents ID, a difference between the contents ID and the node ID is the smallest, although in practice it is sufficient that it is consistent when allotting a management of the contents data to the node apparatus 1. In the example shown in FIG. 2, based on the definition, a contents IDa is managed by a node apparatus 1 having a node ID near the contents IDa (hereafter called a "node IDa"), a contents IDb is managed by a node apparatus 1 having a node ID near the contents IDb (hereafter called a "node IDb"), and a contents IDc is managed by a node apparatus 1 having a node ID near the contents IDc (hereafter called a "node IDc").

Herein, "managed" means, not that the node apparatus 1 is holding the contents data, but that "it knows which node apparatus 1 the contents data are being held in". That is, in FIG. 2, the node apparatus 1 which has the node IDa knows in which of the node apparatus 1 the contents data having the contents IDa are being held, and the node apparatus 1 which has the node IDb, and the node apparatus 1 which has the node IDc, also know, in the same way, in which of the node apparatus 1 the contents data having the contents IDb, and the contents data having the contents IDc, respectively are being held. In this way, the node apparatus 1 which knows in which of the node apparatus 1 certain contents data are being held is called a root node apparatus of those contents data. That is, the node apparatus 1 which has the node IDa is the root node apparatus of the contents data having the contents IDa, the node apparatus 1 which has the node IDb is the root node apparatus of the contents data having the contents IDb, and the node apparatus 1 which has the node IDc is the root node apparatus of the contents data having the contents IDc.

Also, a contents management apparatus 10, which has a function of distributing contents data to a root node apparatus within the contents distribution system S, in order to make the node apparatus a contents holding node apparatus, and a function of generating a catalog list and providing it to the node apparatus, is provided in the contents distribution system S.

1.2. Routing Table Compilation

Herein, referring to FIGS. 3A and 3B, a description will be given of one example of a method of compiling a routing table used in the DHT. FIGS. 3A and 3B show one example of an aspect of a routing table being compiled by the DHT.

Firstly, as shown in FIG. 3A, an ID space is divided into a number of areas. Although, in practice, a 16-division scale is often used, four divisions will be used here, in order to simplify the description, and ID's will be expressed in bit lengths of eight bits in base four. Then, taking a node ID of a node apparatus 1N to be "1133", a description will be given of an example of making a routing table of the node apparatus 1N.

Level 1 Routing

Firstly, in a case of dividing the ID space into four, it is divided into four areas, "0XXX", "1XXX", "2XXX" and "3XXX" (X is a positive integer between 0 and 3 inclusive, the same applying hereafter), of which first digits differ when each area is expressed in base four. The node apparatus 1N, a node ID of the node apparatus 1N itself being "1133", exists in the area "1XXX" in a bottom left in FIG. 3A. Then, the node apparatus 1N appropriately selects a node apparatus 1 existing in an area (that is, the area "0XXX", the area "2XXX" or the area "3XXX") other than the area in which it exists itself (that is, the area "1XXX"), and stores position information of the relevant node ID, that is, an IP address of the relevant node ID, in a level 1 table. FIG. 4 is one example of the level 1 table. The table shows a condition in which "0100" is selected as node ID of the area "0XXX", "2133" as node ID of the area "2XXX", and "3213" as node ID of the area "3XXX". As a second column of the level 1 shows the node apparatus 1N itself, it is not necessary to store an IP address.

Level 2 Routing

Next, as shown in FIG. 3B, of the four areas formed by the heretofore described routing, the node apparatus 1N further divides the area in which it exists itself ("1XXX") in four, making it into four new areas, "10XX", "11XX", "12XX" and "13XX". Then, in the same way as heretofore described, the node apparatus 1N appropriately selects a node apparatus 1 existing in an area other than the area in which it exists itself ("11XX"), and stores an IP address, which is position information of the relevant node ID, in a level 2 table. FIG. 4 is one example of the level 2 table. The table shows a condition in which "1003" is selected as node ID of the area "10XX", "1221" as node ID of the area "12XX", and "1313" as node ID of the area "13XX". A second column of the level 2 being the area "11XX" in which the node apparatus 1N exists, an IP address is not stored, because it is tabulated in a level 3, to be described hereafter. Also, in the event that no node apparatus exists in the heretofore described areas, node ID and IP address sections are empty.

Level 3 Routing

Furthermore, of the four areas formed by the heretofore described routing, the node apparatus 1N further divides the area in which it exists itself ("11XX") in four, making it into four new areas, "110X", "111X", "112X" and "113X". Then, in the same way as heretofore described, the node apparatus 1N appropriately selects a node apparatus 1 existing in an area other than the area in which it exists itself ("113X"), and stores an IP address, which is position information of the relevant node ID, in a level 3 table. FIG. 4 is one example of the level 3 table. A fourth column of the level 3 being the area in which the node apparatus 1N exists, an IP address is not stored, because it is tabulated in a level 4, to be described hereafter. Also, in the event that no node apparatus exists in the heretofore described areas, the node ID and IP address sections are empty.

In this way, by compiling the routing table, as shown in FIG. 4, in the same way as far as the level 4, it is possible to encompass all the eight bit ID. Each time the level rises, empty spaces in the table stand out more.

All the node apparatus 1 individually compile and possess a routing table compiled in accordance with the heretofore described method. In this way, each node apparatus 1 having a routing table in which are correlated node ID (identification information) and IP addresses (position information) of one portion of node apparatus 1 among the plurality of node apparatus 1 in the contents distribution system S, the routing table is stored in a routing table storage section, to be described hereafter.

1.3. Contents Data Search Method

Figure 5:
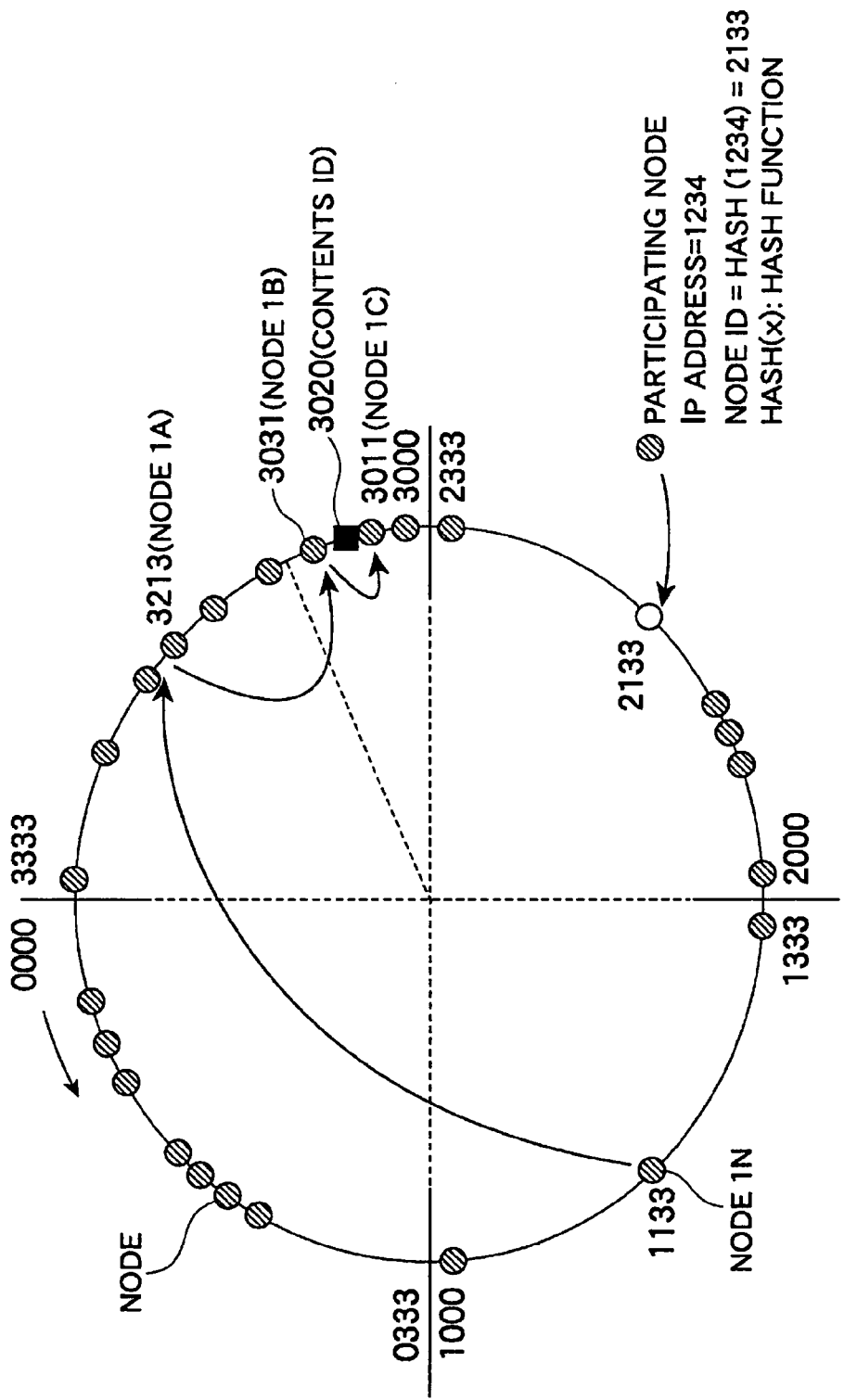
FIG. 5 is a diagram showing one example of an aspect of a node apparatus 1, which is a contents data holding source, being searched for by the DHT.
Figure 6:
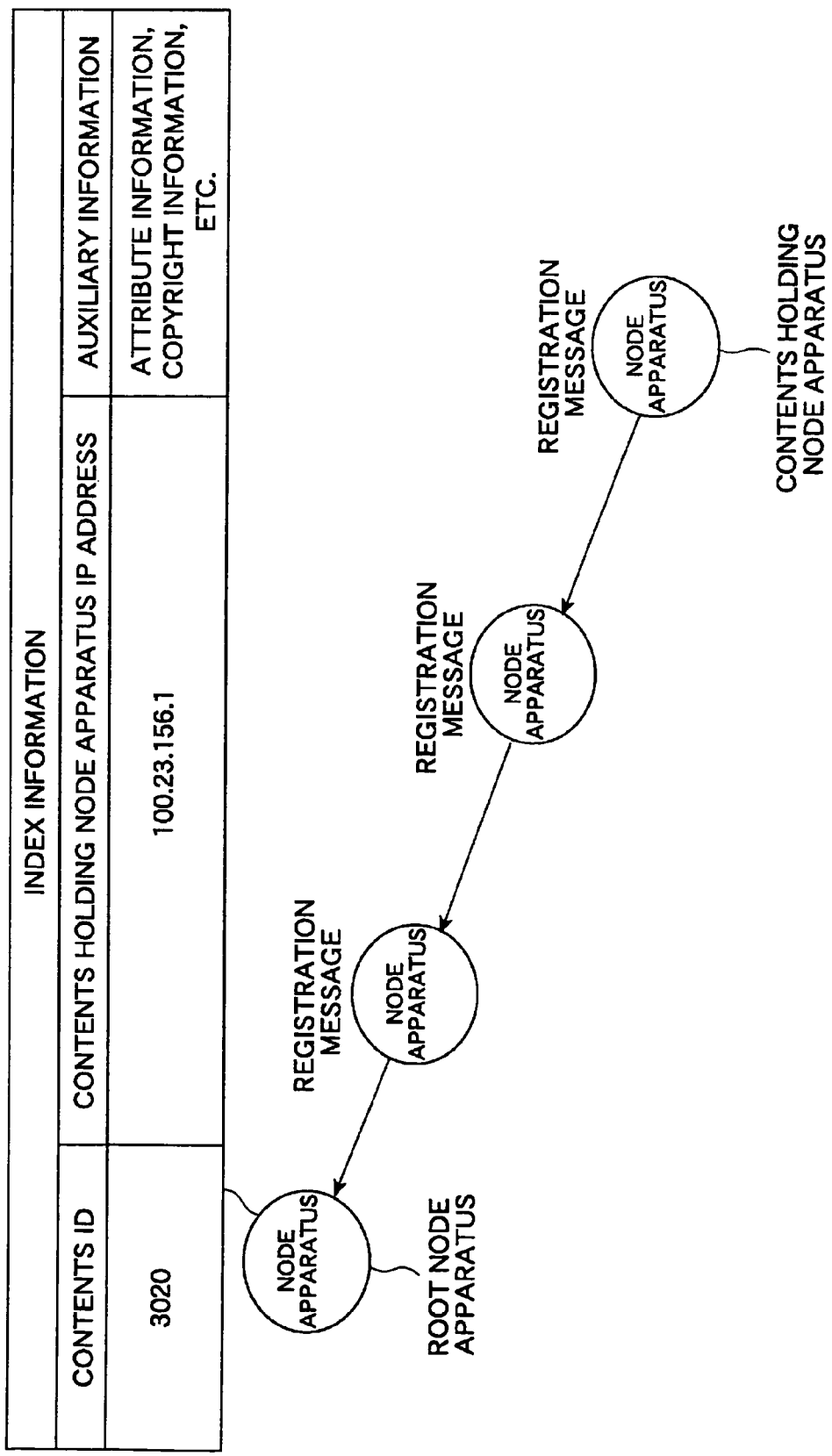
FIG. 6 is a diagram of an aspect of a contents holding node apparatus registration message being forwarded, represented in a spanning tree shape.

Next, referring to FIG. 5, a description will be given of one example of a method of searching for a node apparatus 1 which is holding contents data. FIG. 5 is a diagram showing one example of an aspect of a node apparatus 1 which is holding contents data being searched for by the DHT.

Herein, a description will be given of a procedure when the node apparatus 1N with the node ID "1133" searches for contents data which have a contents ID "3020". Hereafter, a node apparatus which searches for contents data, and requests a reception of the contents data, in this way will be called a "request node apparatus".

The request node apparatus 1N, referring to the level 1 table of the routing table which it is holding itself, transmits a request for a transmission (hereafter called a "contents search message") of contents data distribution source information (information including position information of the contents holding node apparatus), with node ID of a node apparatus having a node ID of the same area as the contents ID "3020" as destination identification information. That is, as the contents. ID "3020" is in the area "3XXX", it transmits the contents search message to, among node apparatus 1 belonging to the area "3XXX", a node apparatus 1A (node ID "3213") of which it knows an IP address (that is, of which the IP address is stored in the routing table which it is holding itself). In this way, the contents search message including the contents ID, which is unique identification information corresponding to the contents, the contents ID is used as the destination identification information in the contents search message.

According to the example shown in FIG. 5, as the IP address of the node apparatus 1A, of which the node ID is "3213", is stored in the routing table of the request node apparatus 1N (refer to FIG. 4), the request node apparatus 1N transmits the contents search message to the node apparatus 1A, of which the node ID is "3213".

Next, the node apparatus 1A which has received the contents search message determines whether or not the contents search message is a message directed to the node apparatus 1A itself. The determination of whether or not it is a message directed to the node apparatus 1A itself is carried out based on the destination identification information and the routing table. Specifically, it is determined whether or not the destination identification information is near the identification information of the node apparatus 1A itself. That is, the node apparatus 1A determines, from the identification information of the node apparatus stored in the routing table which the node apparatus 1A itself is holding, whether the identification information of the nearest node apparatus is its own, or that of another node apparatus. Herein, as the identification information of another node apparatus 1 is nearer the destination identification information than the identification information of the node apparatus 1A itself, the node apparatus 1A refers to the level 2 table of the routing table which the node apparatus 1A itself is holding, and forwards the contents search message to, among node apparatus 1 belonging to the area "30XX", a node apparatus 1B (node ID "3031") of which it knows an IP address.

In this way, the forwarding of the contents search message proceeding by a procedure of matching digits of the contents ID in order from a first digit, when eventually arriving at a node apparatus 1C which manages the contents data, that is, the root node apparatus, the root node apparatus searches for the contents ID "3020" included in the contents search message from among index information, to be described hereafter, which it manages itself, and returns an IP address, and the like, of a contents holding node apparatus which possesses the contents data to the request node apparatus 1N. A system which forwards a message, such as the contents search message, in the heretofore described way until it arrives at an objective node apparatus is called a DHT routing.

In this way, the request node apparatus 1N becoming aware of the position information of the contents data with the contents ID "3020", that is, the IP address of the contents holding node apparatus which holds the contents data with the contents ID "3020", by receiving it from the root node apparatus 1C, it acquires the contents data by downloading them from the contents holding node apparatus.

1.4. Method of Registering in Index Table

A description will be given of a method when, in the contents distribution system S with this kind of configuration, disclosing new contents data in such a way that they are visible to another node apparatus in the contents distribution system S.

With the contents distribution system S in the embodiment, as shown in FIG. 2, the contents management apparatus 10 transmits, to each root node apparatus, contents data of management subject contents for each root node apparatus. The root node apparatus which receives the contents data which are the subject of management from the contents management apparatus 10 stores the contents data received in a second memory 104, to be described hereafter. Subsequently, the root node apparatus decides on a node ID of a node apparatus which is to hold the contents data, and requests the node apparatus having the relevant node ID to hold the contents data. The node apparatus which receives the contents data holding request holds the contents data transmitted along with the contents data holding request, and functions as the contents holding node apparatus. Also, the node apparatus which receives the contents data holding request transmits a message to the root node apparatus registering contents data distribution source information (hereafter called a "registration message"), including an IP address which is position information of the node apparatus itself as the contents holding node apparatus. The root node apparatus acquires the IP address, which is the position information of the contents holding node apparatus, included in the registration message transmitted from the contents holding node apparatus, and registers it in an index table 120 (corresponding to one example of a distribution source information storage section), to be described hereafter. On the IP address, which is the position information of the contents holding node apparatus, being registered in the index table 120 of the root node apparatus in this way, the position information of the contents holding node apparatus registered in the index table is returned to a request node apparatus in response to a subsequent contents search message from the request node apparatus. By so doing, in the embodiment, by registering the contents distributed from the contents management apparatus in the contents holding node apparatus, and allowing to search for them via the root node apparatus, the contents are disclosed to another node apparatus 1.

It is also acceptable, rather than the root node apparatus deciding on the node apparatus which is to become the contents holding node apparatus, and distributing the contents data which are the subject of management, to arrange in, for example, the following way; the contents management apparatus 10 decides on the node apparatus which is to become the contents holding node apparatus, and distributes the contents data which are the subject of management. Then, the contents holding node apparatus to which the contents data are distributed transmits a registration message toward a node apparatus which has a node ID the same as the contents ID obtained from the contents title, or the like (it is not known at this point whether or not this node apparatus actually exists). Then, the registration message too, in the same way as the heretofore described contents search message, being continuously forwarded in accordance with the routing table, when it has been forwarded as far as the node apparatus 1 which has the node ID nearest the contents ID included in the registration message, in the event that the node apparatus 1 determines that there is no longer any other node apparatus which is a transmission destination, it determines that the node apparatus 1 itself should become the root node apparatus of the contents, and stores the contents ID, which is the contents data distribution source information included in the registration message, the IP address of the contents holding node apparatus, and auxiliary information (attribute information such as a title, a genre, or extended information, copyright information such as a director's name, or a streaming time, or the like) in the index table 120 as the index information.

The index table 120, as shown in FIG. 7, being a table for storing the contents data distribution source information including the IP address, which is the position information (location information) of the contents holding node apparatus, and the like, functions as the distribution source information storage section. As well as the IP address of the contents holding node apparatus, the contents ID, a time necessary for a streaming distribution of the contents data corresponding to the contents ID (unit: seconds; hereafter called the "streaming time"), and a time at which the contents holding node apparatus has been introduced, are stored line by line (a predetermined storage area) in the index table 120 as the contents data distribution source information. The auxiliary information is omitted here.

Furthermore, a flag which indicates whether the contents data distribution source information is held directly within the index table 120, or whether the index table 120 is extended to another node apparatus (hereafter called an "external node apparatus"), is provided as the attribute information in the index table 120. That is, information on the flag which indicates whether the contents data distribution source information is stored directly, or whether it is stored in an external node, is stored line by line. The index table 120 shown in FIG. 7 is taken to be the one held by the node apparatus 1C with the node ID "3011" in FIG. 5. That is, it is the index table 120 of the root node apparatus 1C of the contents data having the contents ID "3020".

Also, storage areas of the index table 120 include a management information storage area which stores position information A of the contents data which it holds itself (refer to (A) in FIG. 7), that is, first position information A which is position information of the contents holding node apparatus 1 which holds the contents data which are the subject of management (hereafter called a "management subject contents holding node apparatus"). Herein, as it is a storage area relating to the contents which the root node apparatus manages, the contents ID is "3020". Also, the storage areas include an extension management information storage area which stores position information B of management subject contents held by an external node apparatus (refer to (B) in FIG. 7), that is, second position information B which is position information of a node apparatus holding the position information of the management subject contents holding node apparatus. Herein too, as it is a storage area relating to the contents which the root node apparatus manages, the contents ID is "3020".

Information indicating "Direct" (information indicating that the root node apparatus itself is storing the position information of the management subject contents holding node apparatus) as the flag is correlated to the first position information A, and information indicating "Extension" (information indicating that an external node apparatus is storing the position information of the management subject contents holding node apparatus) as the flag to the second position information B, and stored in the index table 120.

Furthermore, the index table 120 includes a non-management information storage area which stores position information C of contents data which, being contents data which are not a management subject of the root node apparatus 1C itself, are entrusted by an external node apparatus (hereafter called "non-management subject contents data"; herein taken as the contents with the contents ID's "2110" and "0130") (refer to (C) in FIG. 7), that is, third position information C, which is position information of a contents holding node apparatus which holds non-management subject contents data forwarded from an external node apparatus 1 (hereafter called a "non-management subject contents holding node apparatus"). Also, the index table 120 includes an extension non-management information storage area which, when the root node apparatus 1C itself causes the position information of the non-management subject contents holding node apparatus entrusted by the external node apparatus to be further held by another external node apparatus, stores position information D of the other external node apparatus (refer to (D) in FIG. 7), that is, fourth position information D, which is the position information of the node apparatus which, the position information of the non-management subject contents holding node apparatus forwarded from the external node apparatus 1 being further forwarded, is caused to hold the position information of the non-management subject contents holding node apparatus.

Figure 8:
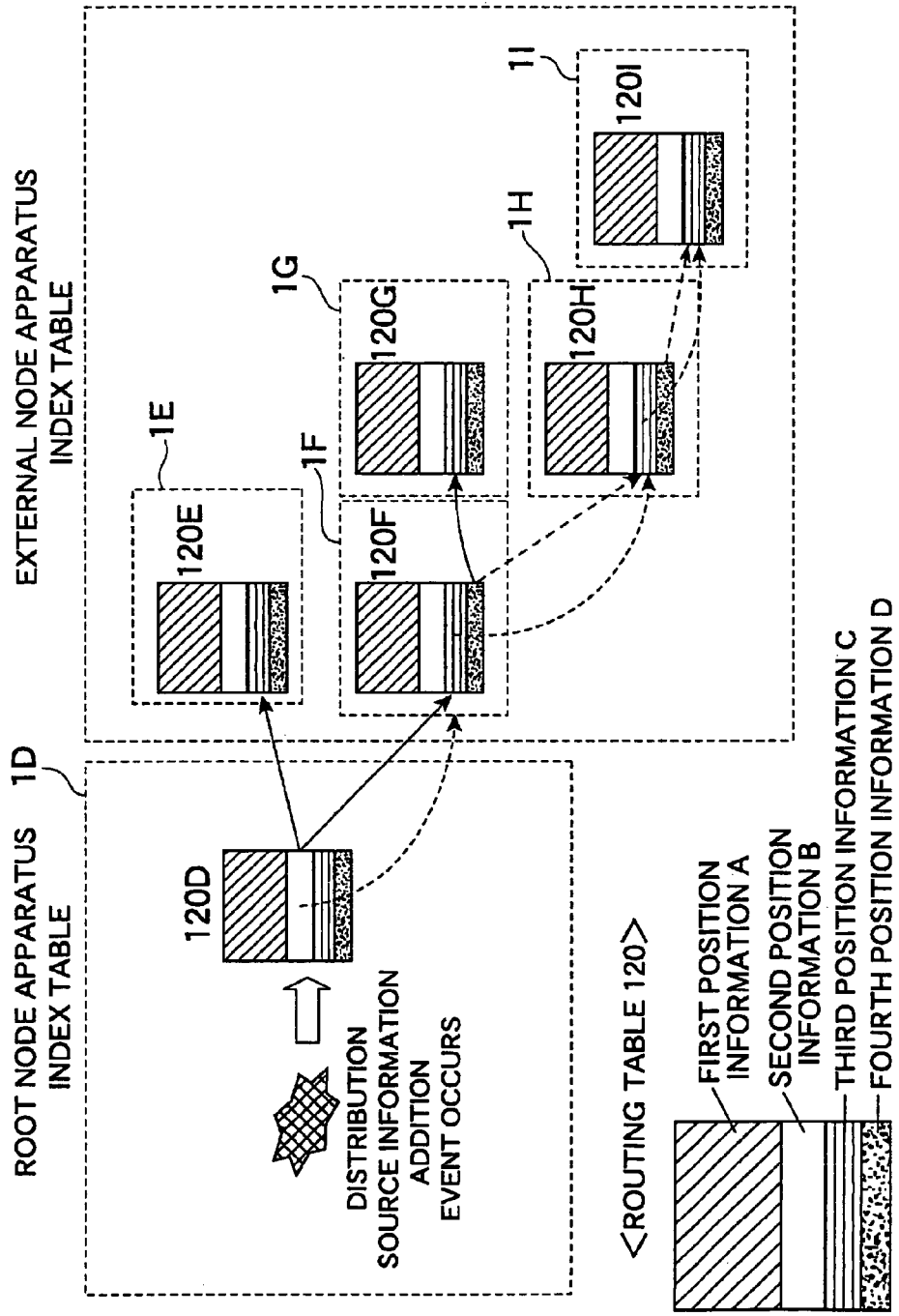
FIG. 8 is one example of an index extended to an external node apparatus.

Then, by using the index table configured as heretofore described, it is possible to cause even a node apparatus with a small storage capacity, such as in the case of a set-top box, to function as a root node apparatus. Hereafter, a specific description will be given, referring to the drawings. FIG. 8 is a diagram showing one example of a link between an index table of a root node apparatus and an index table of an external node apparatus.

As shown in FIG. 8, an index table 120D of a root node apparatus 1D is linked to index tables 120E to 120I of a plurality of external node apparatus 1E to 1I. That is, the index table 120D of the root node apparatus 1D stores position information of the external node apparatus 1E and the external node apparatus 1F as second position information B, while the external node apparatus 1E and the external node apparatus 1F store position information of a contents holding node apparatus holding contents data which are management subject contents of the root node apparatus 1D (a non-management subject contents holding node apparatus as seen from the external node apparatus 1E and the external node apparatus 1F), as third position information C, in the extension management information storage area. Consequently, the root node apparatus 1D, even in the event that a management information storage area for storing the position information of the management subject contents holding node apparatus has a small capacity, can store the position information of the management subject contents holding node apparatus in the index tables of the external node apparatus 1E, 1F and the like.

Furthermore, position information of the external node apparatus 1G and the external node apparatus 1H is stored as fourth position information D in the index table 120F of the external node apparatus 1F, while the external node apparatus 1G and the external node apparatus 1H store position information of the non-management subject contents holding node apparatus holding the contents data which are the management subject contents of the root node apparatus 1D, as third position information C, in the extension management information storage area. Consequently, the external node apparatus 1F, even in the event that a non-management information storage area for storing the position information of the contents holding node apparatus has a small capacity, can further store the position information of the non-management subject contents holding node apparatus in the index table of the external node apparatus 1G and the like.

Areas storing the first position information to fourth position information being provided in the node apparatus 1 in the embodiment in this way, by this means, even in a case in which it is not possible to enlarge the capacity of the index table of the root node apparatus 1D, the external node apparatus 1E and the like, it is possible to return increasing position information of contents holding node apparatus to a request node apparatus.

Herein, the root node apparatus 1D, on a distribution source information addition event occurring, that is, at a time when position information of a management subject contents holding node apparatus is to be stored, selects whether or not to store the position information of the management subject contents holding node apparatus to be stored in the index table 120D of the root node apparatus 1D itself.

The root node apparatus 1D, when selecting to hold the position information of the management subject contents holding node apparatus in the index table 120D of the root node apparatus 1D itself, stores the position information of the management subject contents holding node apparatus, included in the contents data distribution source information received from the management subject contents holding node apparatus, in the management information storage area as first position information.

On the other hand, when selecting not to hold the position information of the management subject contents holding node apparatus in the index table 120D of the root node apparatus 1D itself, that is, when selecting to cause the position information of the management subject contents holding node apparatus to be held in the index table of an external node apparatus, the root node apparatus 1D selects the node apparatus 1F having the index table 120F as the other node apparatus, and transmits an index extension request message to the node apparatus 1F. On a positive reply being returned from the node apparatus 1F in response to the index extension request message, the root node apparatus 1D, as well as transmitting a distribution source information addition request message, including the position information and contents ID of the management subject contents holding node apparatus, to the node apparatus 1F, stores the position information of the external node apparatus 1F in the extension management information storage area as second position information B. FIG. 8 shows the root node apparatus 1D selecting to hold the position information of the management subject contents holding node apparatus in the index table of the external node apparatus 1F.

The node apparatus 1F, on receiving the index extension request message transmitted from the root node apparatus 1D, selects whether or not to store the non-management subject contents data distribution source information in the node apparatus 1F in the index table 120F of the node apparatus 1F itself. When selecting to store it in the index table 120F of the node apparatus 1F itself, the node apparatus 1F returns a positive reply in response to the index extension request message transmitted from the root node apparatus 1D, and subsequently stores the position information of the non-management subject contents holding node apparatus transmitted from the root node apparatus 1D, as third position information, in the non-management information storage area. On the other hand, when selecting not to store the information in the index table 120F of the node apparatus 1F itself, that is, when selecting to cause the position information of the non-management subject contents holding node apparatus to be held in the index table of another external node apparatus, the node apparatus 1F forwards the index extension request message received to the node apparatus 1H and, on receiving a positive reply from the node apparatus 1H in response to the forwarded index extension request message, transmits a positive reply in response to the index extension request message received to the root node apparatus 1D and subsequently forwards a distribution source information addition message, transmitted from the root node apparatus 1D, to the external node apparatus 1H. Also, the node apparatus 1F stores the position information of the external node apparatus 1H, as fourth position information, in the extension non-management information storage area. FIG. 8 shows the node apparatus 1F selecting to hold the position information of the non-management subject contents holding node apparatus in the index table 120H of the other external node apparatus 1H.

The node apparatus 1H, on receiving the index extension request message transmitted from the external node apparatus 1F, selects whether or not to store the non-management subject contents data distribution source information in the index table 120H of the node apparatus 1H itself. When selecting to store it in the index table 120H of the node apparatus 1H itself, the node apparatus 1H returns a positive reply to the node apparatus 1F in response to the index extension request message received, and subsequently stores the position information of the non-management subject contents holding node apparatus transmitted from the node apparatus 1F, as third position information, in the non-management information storage area. On the other hand, when selecting not to store the information in the index table 120H of the node apparatus 1H itself, that is, when selecting to cause the position information of the non-management subject contents holding node apparatus to be held in the index table of another external node apparatus, the node apparatus 1H forwards the index extension request message received to the node apparatus 1I and, on receiving a positive reply from the node apparatus 1I in response to the forwarded index extension request message, transmits a positive reply in response to the index extension request message received to the root node apparatus 1F, and subsequently forwards a distribution source information addition message, transmitted from the root node apparatus 1F, to the external node apparatus 1I. Also, the node apparatus 1H stores the position information of the external node apparatus 1I, as fourth position information, in the extension non-management information storage area. FIG. 8 shows the node apparatus 1H selecting to hold the position information of the non-management subject contents holding node apparatus in the index table 120I of the other external node apparatus 1I.

The node apparatus 1I, on receiving the index extension request message transmitted from the external node apparatus 1H, selects whether or not to store the non-management subject contents data distribution source information in the index table 120I of the node apparatus 1I itself. When selecting to store it in the index table 120I of the node apparatus 1I itself, the node apparatus 1I returns a positive reply to the node apparatus 1H in response to the index extension request message received, and subsequently stores the position information of the non-management subject contents holding node apparatus transmitted from the node apparatus 1H, as third position information, in the non-management information storage area. FIG. 8 shows the node apparatus 1I selecting to hold the position information of the non-management subject contents holding node apparatus in the index table 120I of the node apparatus 1I itself.

Areas storing the first position information to fourth position information being provided in each node apparatus 1 in the embodiment in this way, the node apparatus 1 can store the position information of the contents holding node apparatus in the index table of the node apparatus 1 itself, or store the position information of the contents holding node apparatus in the index table of another node apparatus 1.

Meanwhile, in a case in which position information of a management subject contents holding node apparatus to be newly stored arises in the node apparatus 1, the selection of whether or not to store the position information of the management subject contents holding node apparatus in the index table 120 of the root node apparatus itself is determined in, for example, the following way. Hereafter, the root node apparatus will be described as the root node apparatus 1D.

1. In the event that position information of a contents holding node apparatus to be newly stored arises, in a condition in which less than a predetermined number (for example, 13 in FIG. 7) of items of first position information A are stored in the management information storage area, the root node apparatus 1D selects to store it in the index table 120D of the root node apparatus 1D itself. Meanwhile, in the event that the position information of the contents holding node apparatus to be newly stored arises in a condition in which the predetermined number of items of first position information A are stored in the management information storage area, the root node apparatus 1D selects not to store the position information of the contents holding node apparatus in the index table 120D of the root node apparatus 1D itself. That is, after storing the predetermined number of items of position information of management subject contents holding node apparatus, the root node apparatus 1D causes the position information of the management subject contents holding node apparatus to be stored in the index table 120 of another node apparatus. In this way, it is possible to store the position information of the management subject contents holding node apparatus using the index table of an external node apparatus.

2. In a condition in which it has received less than a first predetermined amount per unit time of contents search messages addressed to the root node apparatus 1D itself (for example, with a contents data streaming time as the unit time, a condition in which a number of transmission requests in the unit time is not equal to or greater than a number of items of first position information stored in the management information storage area) from a plurality of request node apparatus, the root node apparatus 1D selects to store the position information of the management subject contents holding node apparatus to be newly stored in the index table 120D of the root node apparatus 1D itself. Meanwhile, in a condition in which it has received the first predetermined amount or more per unit time of contents search messages addressed to the root node apparatus 1D itself from a plurality of request node apparatus, the root node apparatus 1D selects not to store the position information of the management subject contents holding node apparatus to be newly stored in the index table 120D of the root node apparatus 1D itself.

Figure 9:
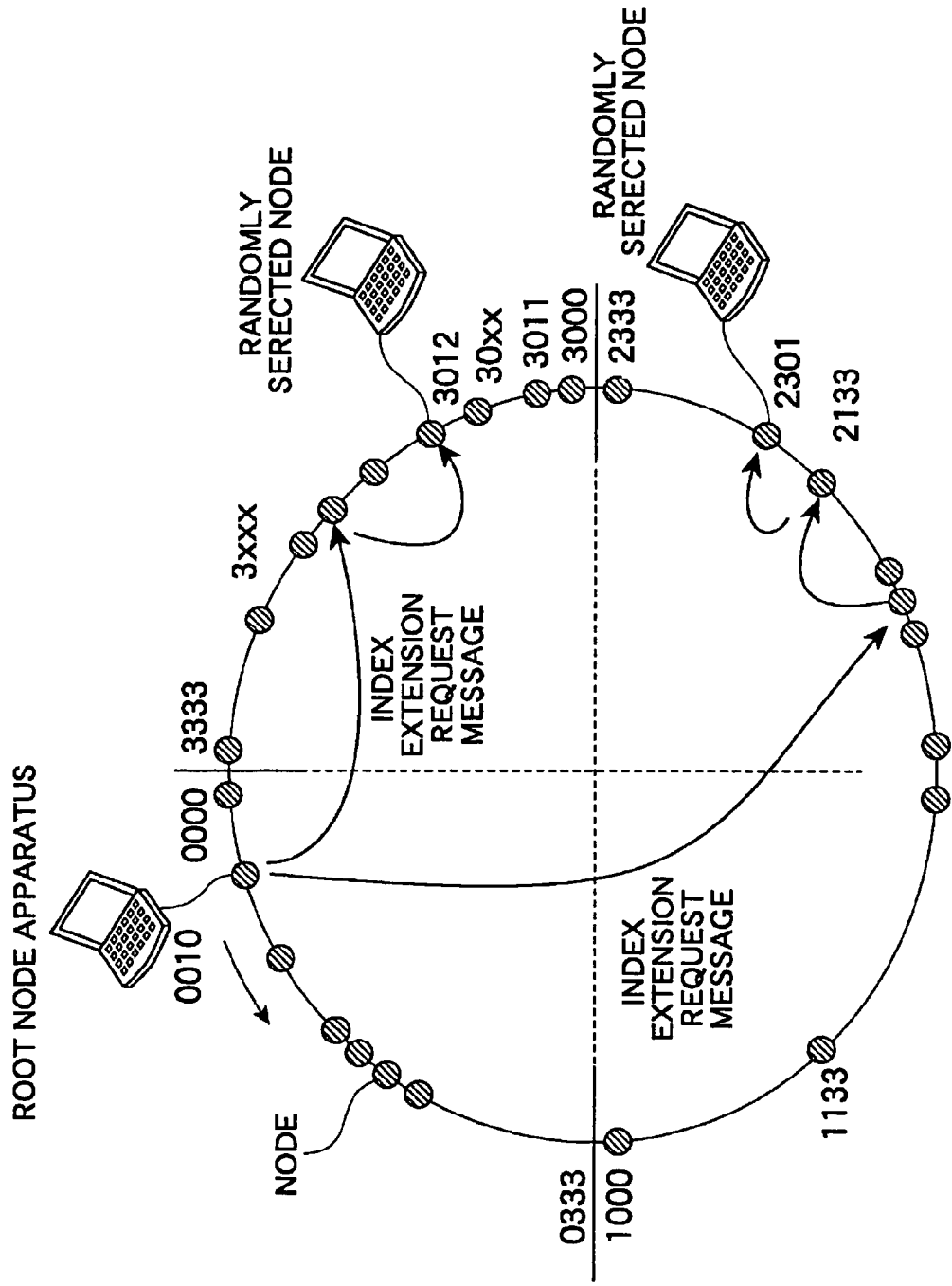
FIG. 9 is a diagram showing one example of an aspect of an index extension operation.

Also, when selecting not to store the position information of the management subject-contents holding node apparatus to be newly stored in the index table 120D of the root node apparatus 1D itself, the root node apparatus 1D decides on an external node apparatus which is to be caused to hold the position information of the contents holding node apparatus. The decision on the external node apparatus which is to be caused to hold the position information of the contents holding node apparatus is made by calculating a random node ID. Then, with the node ID decided on in this way as destination identification information, the root node apparatus 1D transmits an index extension request message. FIG. 9 shows an aspect wherein the root node apparatus 1D with a node ID "0010", in order to cause an external node apparatus to hold the position information of the management subject contents holding node apparatus to be newly stored, decides on node apparatus 1 having node ID's "2301" and "3102", by randomly calculating the external node apparatus. Then, the root node apparatus 1D transmits an index extension request message to the node apparatus 1 having the node ID's "2301" and "3102" decided on in this way.

As a method of deciding on the external node apparatus which is to be caused to hold the position information of the contents holding node apparatus, it is also acceptable, rather than making the node apparatus 1 having the randomly decided on node ID the external node apparatus, to decide on a node apparatus 1 neighboring the root node apparatus as the external node apparatus. By so doing, it is possible to carry out an index extension evenly when looking at the contents distribution system S as a whole.

Herein, a "neighboring node apparatus" refers to a node apparatus of which the node ID is near the root node apparatus in DHT routing, or to a node apparatus which is near the root node apparatus in a physical network. In particular, in the case of making the neighboring node apparatus a node apparatus which is near the root node apparatus in the physical network, it is possible to carry out a forwarding of a contents search message from the root node apparatus to the external node apparatus in a short time. "Near in the physical network" means that a time taken for a message from the root node apparatus to arrive is short, or that a number of pops from the root node apparatus (a number of times going through a router) is small, or the like. The root node apparatus selects the nearest node apparatus from among a plurality of node apparatus having randomly calculated node ID's, and makes the node apparatus the external node apparatus.

Also, as a method of deciding on the external node apparatus which is to be caused to hold the position information of the contents holding node apparatus, it is also acceptable to dispose a condition monitoring server apparatus which intensively monitors a condition of node apparatus 1 currently participating in the contents distribution system S (for example, it is also acceptable to cause the contents management apparatus 10 to have the relevant function), and decide on the external node apparatus by having the condition monitoring server apparatus notify of the external node apparatus. However, as it is conceivable with this method that various kinds of management message will concentrate in the condition monitoring server apparatus, in the embodiment, it is arranged in such a way that, the external node apparatus being decided on randomly, it is possible for the node apparatus to independently decide on the external node apparatus.

In the way heretofore described, the root node apparatus can transmit an index extension request message to the external node apparatus and, after obtaining a positive reply, make various kinds of direct request to the external node apparatus. For example, the root node apparatus can send a distribution source information addition request message, a distribution source information deletion request message, a distribution source information acquisition request message, or the like, to the external node apparatus. Hereafter, a specific description will be given of these request messages.

Distribution Source Information Addition Request Message

The distribution source information addition request message is a message for requesting the external node apparatus to add to the contents data distribution source information.

The root node apparatus, constantly monitoring a number of contents search messages per unit time, newly adds a contents holding node apparatus when it reaches a certain threshold Tu (for example, Tu=0.8). Herein, it is taken that the threshold Tu=(a number of contents search messages in one streaming time)/(a number of items of position information stored in the management information storage area).

Figure 10:
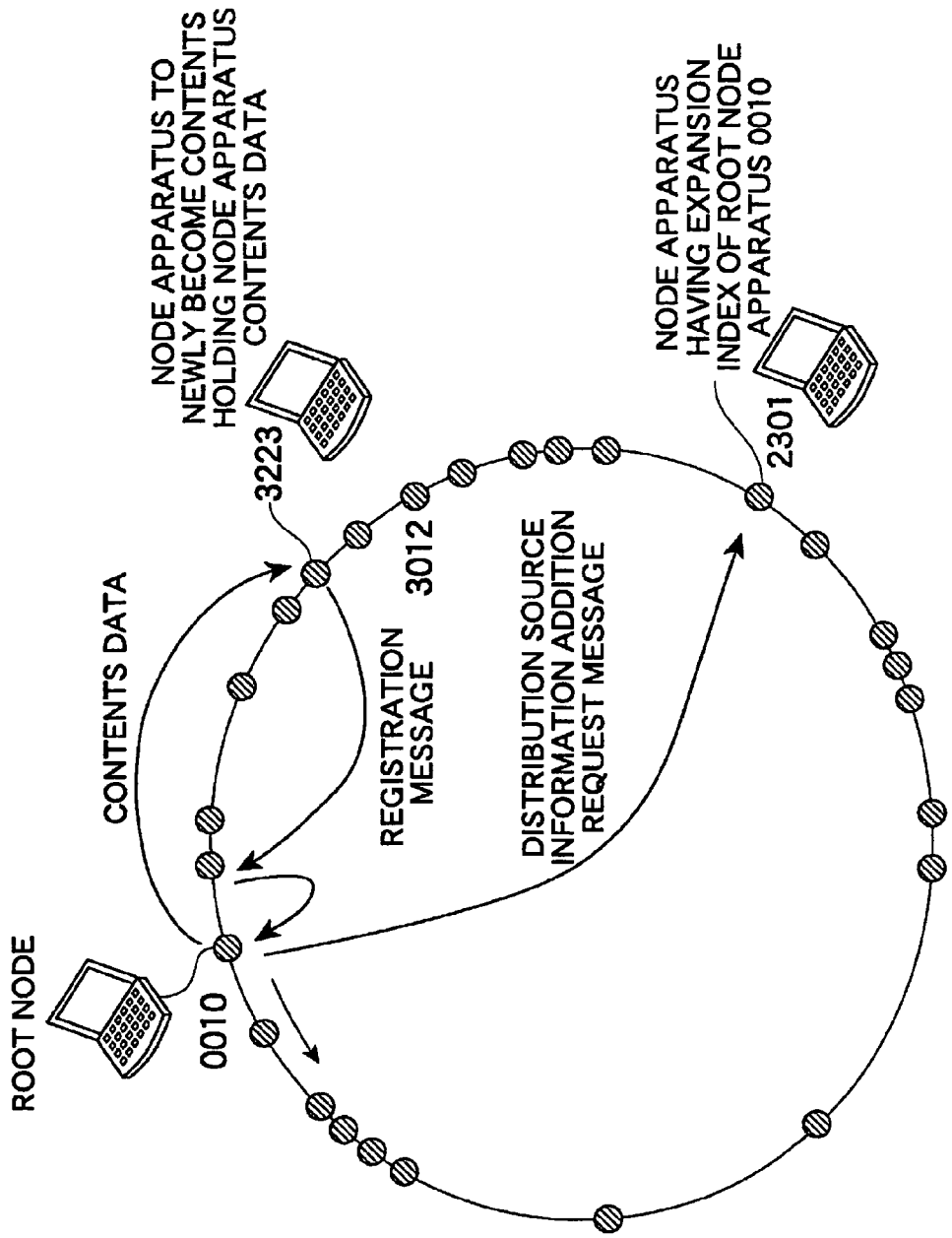
FIG. 10 is a diagram showing one example of an aspect of a contents holding node apparatus addition operation.

As shown in FIG. 10, the root node apparatus (herein, the node apparatus having the node ID "0010") calculates an appropriate (for example, random) node ID among node ID's of node apparatus which are not currently contents holding node apparatus, and transmits the contents data which the node apparatus itself manages to the node apparatus with the relevant node ID. The node apparatus which receives the contents data from the root node apparatus stores the contents data and, acting as the contents holding node apparatus, transmits a registration message toward the root node apparatus, whereon the root node apparatus receives the registration message, and stores the position information of the contents holding node apparatus included in the registration message, as first position information, in the management information storage area.

Figure 11:
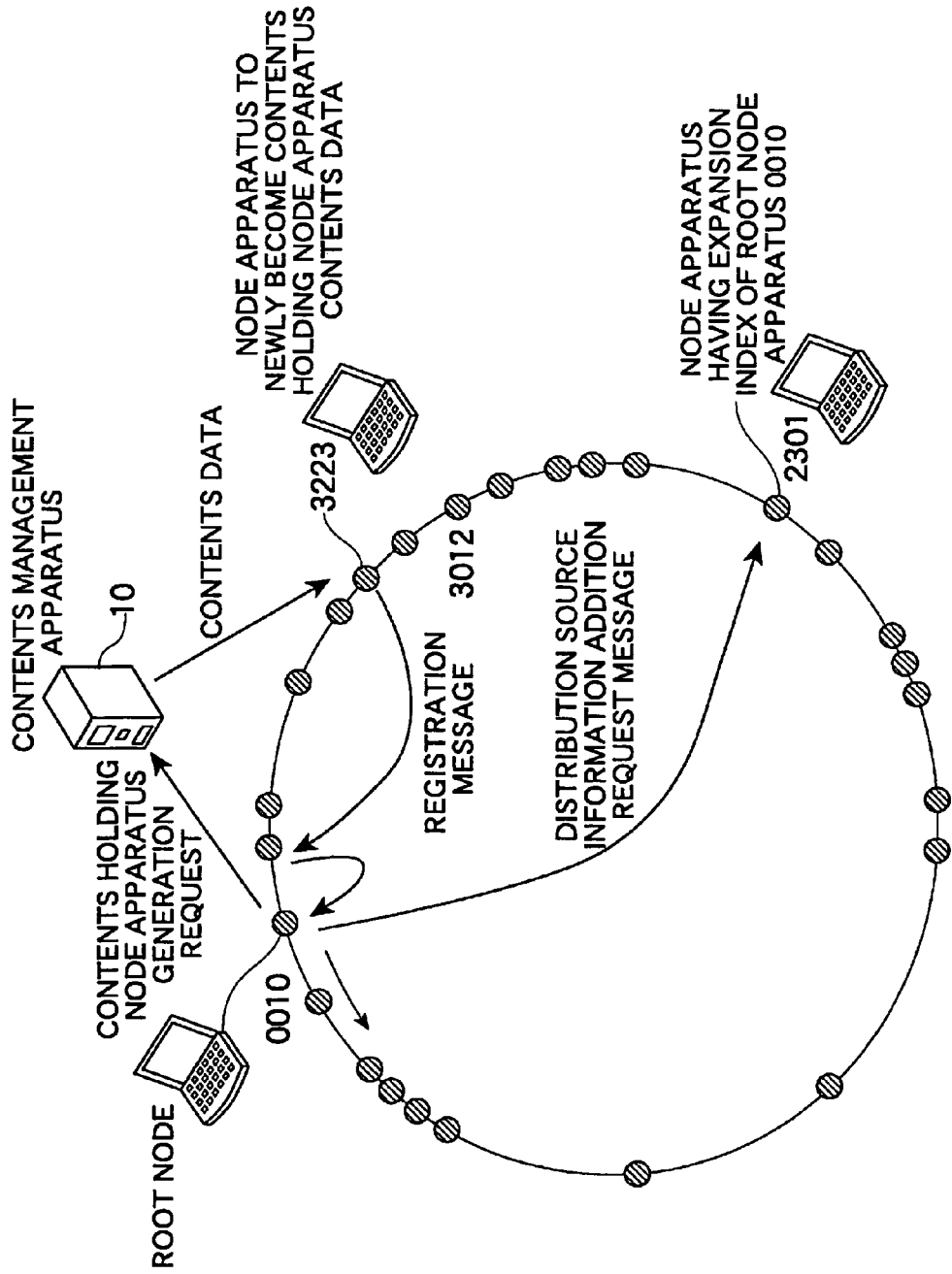
FIG. 11 is a diagram showing another example of an aspect of the contents holding node apparatus addition operation.

It is also acceptable to arrange in such a way that, rather than the root node apparatus generating the contents holding node apparatus by transmitting the contents data, the root node apparatus requests the contents management apparatus 10 to generate the contents holding node apparatus. For example, as shown in FIG. 11, the root node apparatus sends a contents holding node apparatus generation request to the contents management apparatus 10. The contents management apparatus 10, in response to the contents holding node apparatus generation request from the root node apparatus, calculates an appropriate (for example, random) node ID among the node ID's of the node apparatus which are not currently contents holding node apparatus, and transmits the contents data requested by the root node apparatus to the node apparatus with the relevant node ID. The node apparatus which receives the contents data stores the contents data and, acting as the contents holding node apparatus, transmits a registration message to the root node apparatus, whereon the root node apparatus receives the registration message, and stores the position information of the management subject contents holding node apparatus included in the registration message, as first position information, in the management information storage area.

However, when the management information storage area in the root node apparatus is in a full condition (in FIG. 7, when there are 13 items of first position information), contents data distribution source information including the position information of the management subject contents holding node apparatus is added to the external node apparatus which has generated the immediately preceding extension index. When adding the position information of the management subject contents holding node apparatus to the extension index, rather than using DHT routing, a format transmitting the contents distribution source information addition request message directly to the external node apparatus is used. It being possible to transmit directly to the external node apparatus in this way is due to the position information of the external node apparatus being identified by the heretofore described index extension request message. In the event that the non-management contents non-management information storage area in the external node apparatus holding the extension index is in a full condition, a process is carried out further extending the index table from the external node apparatus to another external node apparatus.

The external node apparatus, on receiving the contents distribution source information addition request message, adds the distribution source information to the extension management information storage area as third position information. However, at a time such as when the third position information of the extension management information storage area is in a full condition, in order not to hold the information in the node apparatus itself, an extension index is set for another external node apparatus.

Distribution Source Information Deletion Request Message

The distribution source information deletion request message is a message for requesting the external node apparatus to delete the extended contents data distribution source information.

The root node apparatus, constantly monitoring the number of contents search messages per unit time, deletes one item of contents data distribution source information when it reaches a certain threshold T1 (for example, T1=0.5). The deletion of the contents data distribution source information is such that, in a case in which no second position information B is stored in the extension management information storage area of the index table 120, one item of the contents data distribution source information stored in the management information storage area is deleted. Meanwhile, in a case in which second position information B is stored in the extension management information storage area, the deletion is done on a priority basis from the contents data distribution source information stored in the extension management information storage area. Herein, it is taken that the threshold T1=(the number of contents search messages in one streaming time)/(the number of items of position information stored in the management information storage area).

Figure 12:
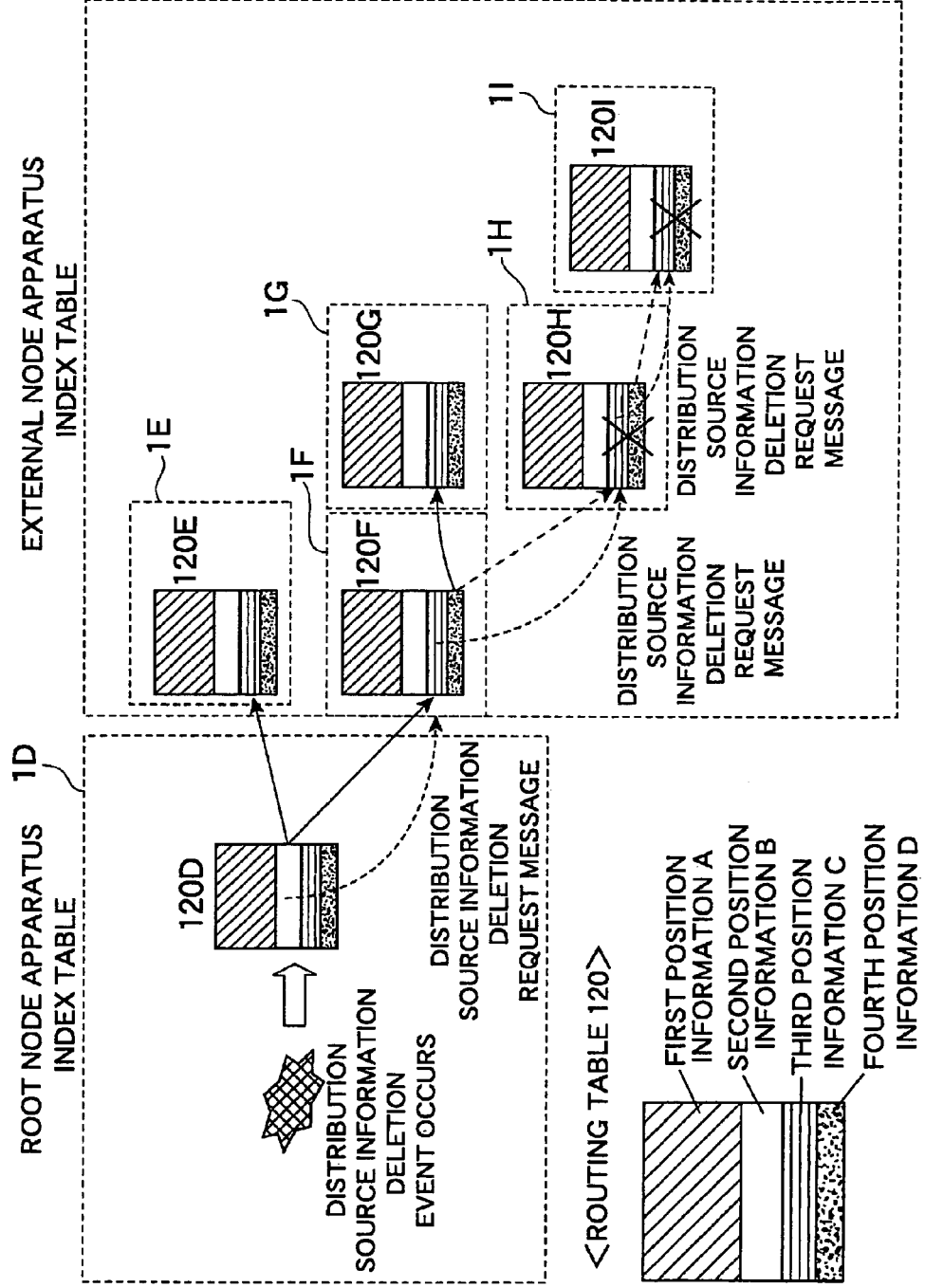
FIG. 12 is a diagram showing one example of an aspect of an operation deleting an extended index.

In a case in which extension indexes are linked in a chain shape, for example, as shown in FIG. 12, in a case in which the position information of the external node apparatus 1E and the external node apparatus 1F is stored in the second position information B of the index table 120D, the position information of the external node apparatus 1G and the external node apparatus 1H in the fourth position information D of the index table 120F, and the position information of the external node apparatus 1I in the fourth position information D of the index table 120H, and the contents data distribution source information is stored in the third position information C of the index tables 120E, 120G and 120I, the distribution source information is deleted starting from the index table 120I, which is a terminal portion of the index tables linked in the chain shape in this way. Then, in the external node apparatus 1I, when the index extended non-management information storage area becomes empty, an extension entry correlated to an index extension entrustment source is deleted. That is, the external node apparatus 1I sends a request to the external node apparatus 1H, which is the index extension entrustment source, to delete the extension entry, and the node apparatus 1H, in accordance with the deletion request, deletes the fourth position information D of the extension non-management information storage area correlated to the external node apparatus 1I. Then, the node apparatus 1H, after deleting the fourth position information D of the extension non-management information storage area of the index table 120H, sends a request to the external node apparatus 1F, which is the index extension entrustment source, to delete the extension entry, and deletes the fourth position information D, which is the position information of the external node apparatus 1H, in the extension non-management information storage area of the index table 120F of the external node apparatus 1F. In the case of requesting the external node apparatus to delete the contents data distribution source information, in the same way as with the contents data distribution source information addition process, the contents data distribution source information deletion request message is transmitted directly to the external node apparatus.

Distribution Source Information Acquisition Request Message

The distribution source information acquisition request message being a message for, when the node apparatus itself, acting as the root node apparatus, receives a contents search message, in order to cause a reply to the contents search message to be returned from the external node apparatus having the extension index, requesting the external node apparatus to that effect, it is a message forwarded changing the destination node apparatus of the contents search message to the external node apparatus.

The root node apparatus receives the contents search message from a certain external node apparatus. In the root node apparatus which receives the contents search message, firstly, a time elapsed until receiving the contents search message is calculated from a contents search message issuing time included in the contents search message. Then, in a case in which the elapsed time is less than a threshold Ts (example: Ts=200 ms), as shown in FIG. 13A, in order to acquire the contents data distribution source information from the extension index, the root node apparatus carries out a forwarding of the contents search message, that is, a transmission of the distribution source information acquisition request message, to the external node apparatus holding the extension index.

The external node apparatus which receives the distribution source information acquisition request message, in a case in which it is holding the contents data distribution source information as third position information, transmits the contents data distribution source information, including the third position information, to a contents search message transmission source node apparatus, while in a case in which it is not holding the contents data distribution source information as third position information, it carries out a procedure forwarding the contents data distribution source information from the extension index of farther external node apparatus. On the other hand, in a case in which it is detected, in the root node apparatus, that the threshold Ts has been exceeded at a point at which the distribution source information acquisition request message is received, as shown in FIG. 13B, the root node apparatus acquires the contents data distribution source information from the index table of the node apparatus itself, and replies to the distribution source information acquisition request message.

Figure 13A:
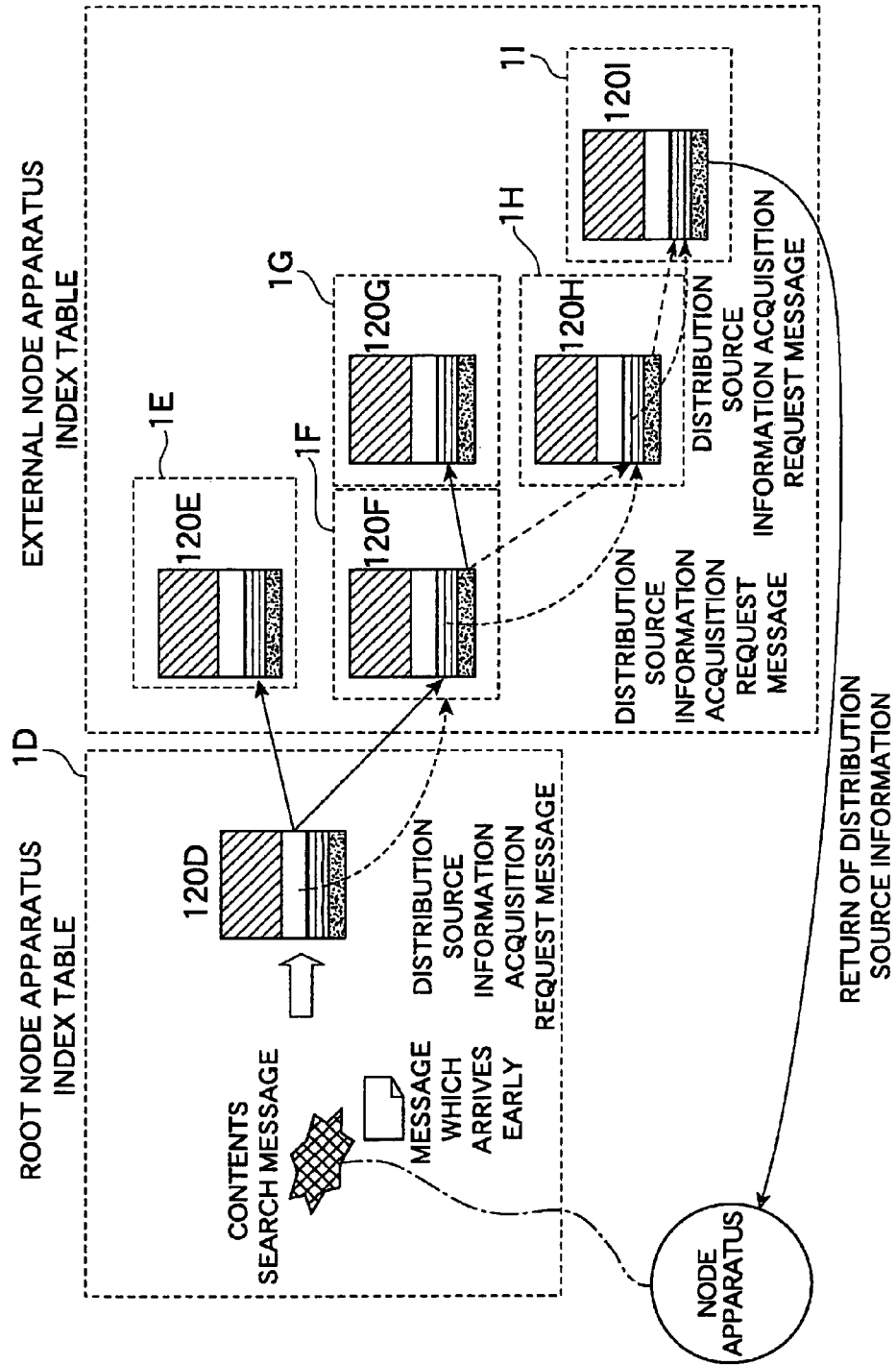
FIG. 13A is a diagram showing one example of an aspect of a reply to a contents search message.
Figure 13B:
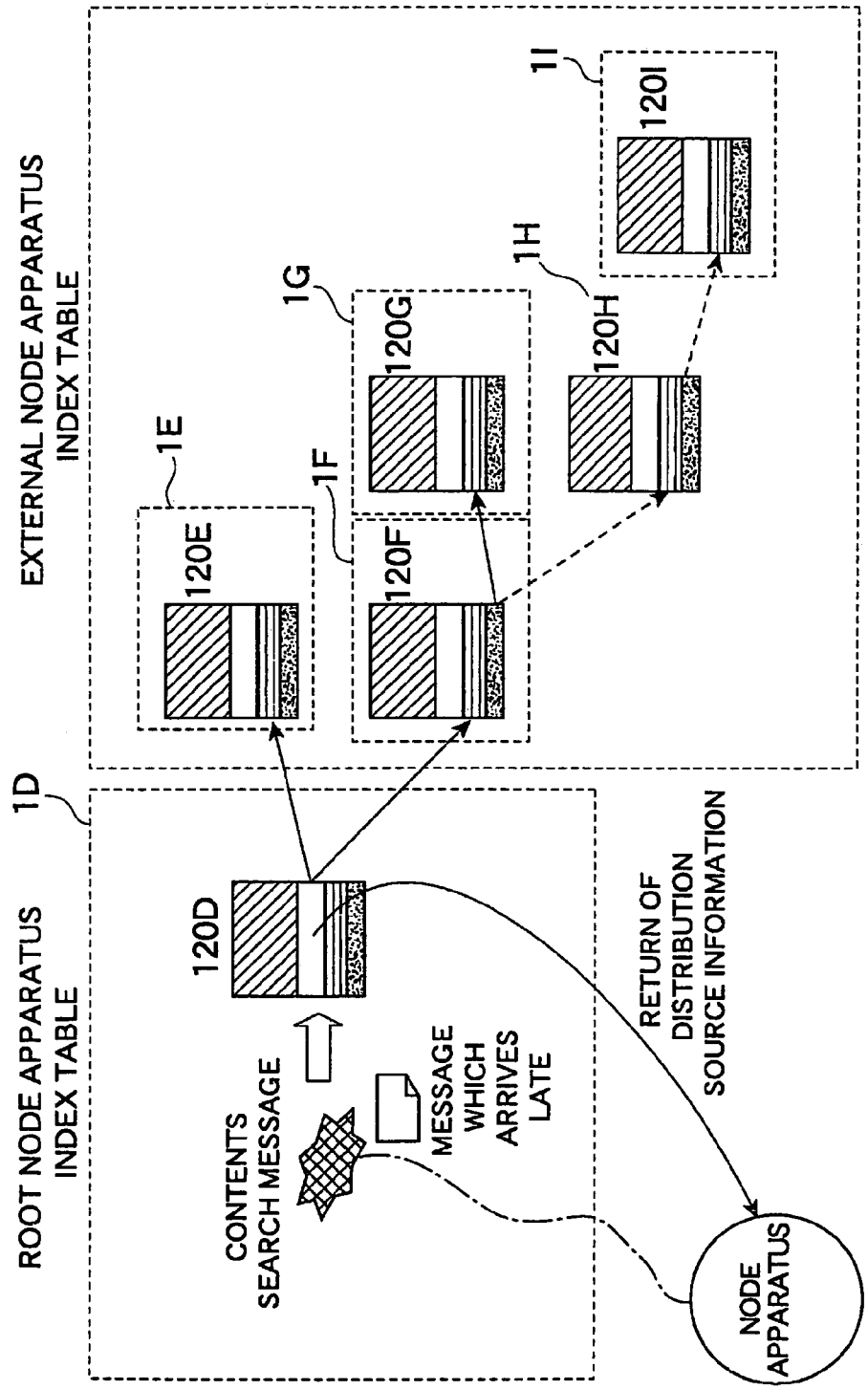
FIG. 13B is a diagram showing one example of an aspect of a reply to a contents search message.

Also, as shown in FIGS. 13A and 13B, in the case in which the extension indexes are linked in the chain shape, it is also acceptable to change a node apparatus, among the node apparatus having the extension indexes, which is caused to reply to the contents search message, depending on an arrival time of the contents search message. For example, in a case in which the elapsed time is 0.5 Ts or less, the contents data distribution source information is caused to be returned from the index table 120I, in a case in which 0.5<Ts≦0.7, it is caused to be returned from the index table 120G, and in a case in which 0.7<Ts≦1.0, it is caused to be returned from the index table 120E.

With this processing method, an object is to equalize a contents search message response time by carrying out the process in such a way as to retrieve the contents data distribution source information from the extension index for a contents search message which arrives early in the root node apparatus, but conversely, directly retrieve the contents data distribution source information from the index of the root node apparatus for a contents search message which arrives late in the root node apparatus.

Although it has been arranged in such a way that, as heretofore described, either the index table of the node apparatus itself, or the index table of the external node apparatus, is selected based on the arrival time of the contents search message transmitted by the request node apparatus, it is also acceptable to arrange in such a way as to make the selection based on an arrival order of the contents search messages. That is, the index table of the root node apparatus is selected for a contents search message which arrives early, while the index table of the external node apparatus is selected for a contents search message which arrives late.

Also, it is also acceptable to arrange in such a way as to make the selection randomly, regardless of the arrival time and arrival order of the contents search messages. In this case, there is a method selecting the index table of the node apparatus itself and the index table of the external node apparatus with an equal probability, a method selecting with a probability according with a proportion of position information stored in the management information storage area and the extension management information storage area, and the like.

2. Description of Configuration and the like of Node Apparatus 1

Figure 14:
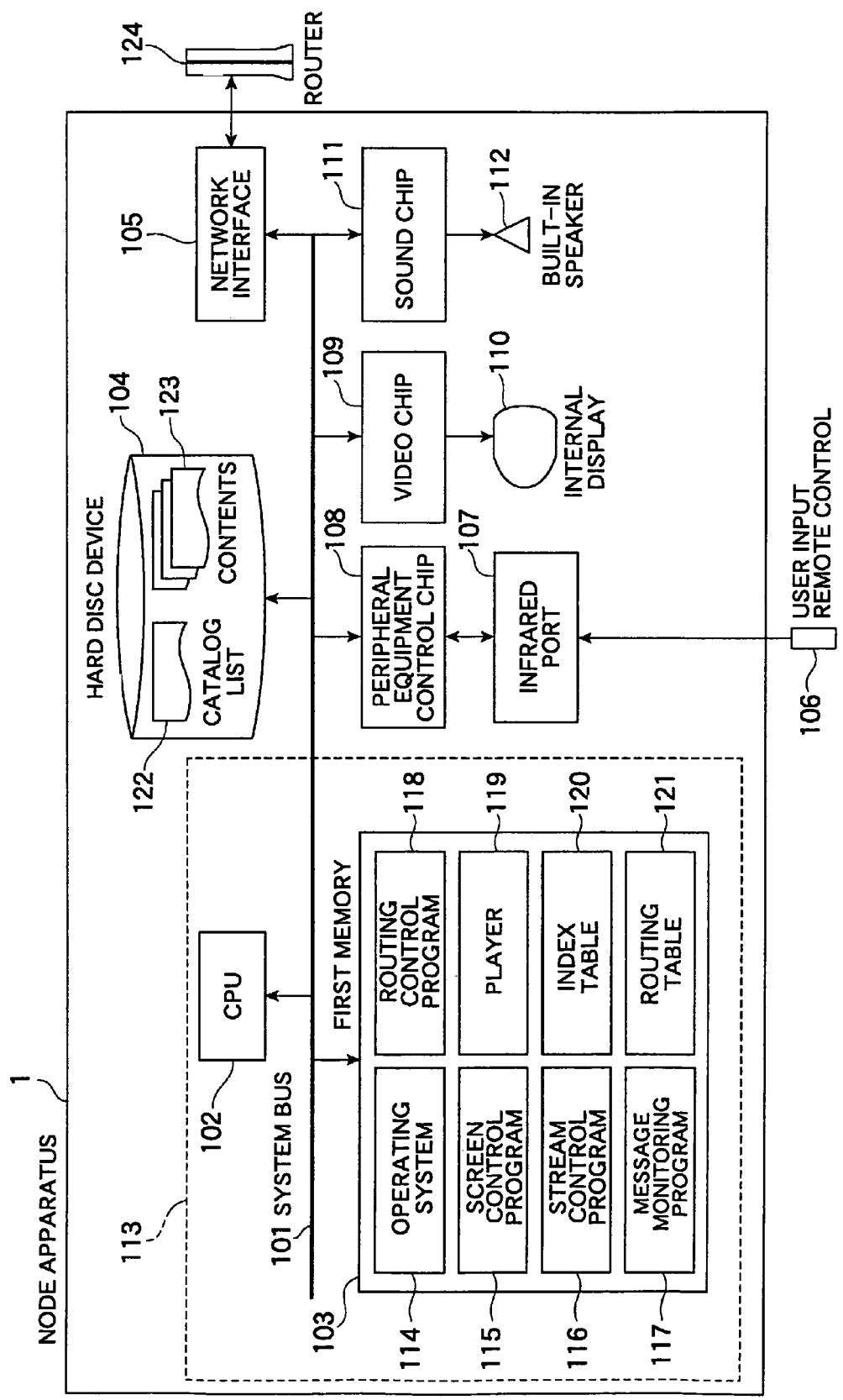
FIG. 14 is a diagram showing an example of an outline configuration of the node apparatus according to the embodiment.

Next, a description will be given of a configuration and operations of the node apparatus 1, referring to the drawings. FIG. 14 is a diagram showing an outline configuration of the node apparatus 1 in the contents distribution system S according to the embodiment.

The node apparatus 1, a general personal computer as well as a designated computer being applicable, being configured, as shown in FIG. 14, including a CPU (Central Processing Unit) 102, a first memory 103, as a rewritable main storage device which stores various kinds of program and the like, a second memory 104, configured of an HDD or the like, which stores various kinds of data and the like, a network interface 105, for carrying out communication with other node apparatus 1 participating in the network 8 via a router 124, a remote control 106, which transmits and receives a predetermined infrared signal for a remote operation by a user of the node apparatus 1, an infrared port 107 for carrying out communication with the remote control 106 by means of infrared rays, a peripheral equipment control chip 108, which controls the infrared port 107, a video chip 109 which receives image data by a control of the CPU 102, writes them into an internal video memory (not shown), and displays the data written into the video memory on a display 110, to be described hereafter, and a sound source chip 111 which has a sound source such as an FM sound source or a Wave Table sound source and, by transmitting an audio signal to a built-in speaker 112, outputs a sound wave from the built-in speaker 112, these various kinds of component are mutually connected via a system bus 101. In the embodiment, a controller 113 is configured of the CPU 102 and the first memory 103.

First Memory 103

Also, an operating system (OS) program 114 for providing basic functions of the node apparatus 1 as a computer, a screen control program 115 for carrying out a control, or the like, of the display 110, a stream control program 116 for stream receiving contents data transmitted from an external node apparatus, which functions as a contents holding node apparatus, and for stream distributing contents data stored in the second memory 104 when the node apparatus itself functions as the contents holding node apparatus, a message monitoring program 117 for determining whether or not a message transmitted from an external node apparatus has been received via the network interface 105, and carrying out a process in accordance with the received message, a routing control program 118 for, when determining that a message received via the network interface 105 is not addressed to its own node apparatus 1, forwarding the received message based on destination identification information of the received message and a routing table, a player program 119 for carrying out a reproduction, and the like, of distributed contents data, and the like being stored in the first memory 103, they are retrieved by the CPU 102, and functions according to the programs are executed by the CPU 102. Also, an index table storage area which is a storage area of the index table 120 (refer to FIG. 7), and a routing table storage area (corresponding to one example of a routing table storage section) for storing the routing table 121 (refer to FIG. 4), are further provided in the first memory 103. Also, the index table 120 having, as heretofore described, the management information storage area, the extension management information storage area, the non-management information storage area, and the extension non-management information storage area, the contents data distribution source information is stored in a storage area appropriate to a condition.

Herein, the OS program 114, by being retrieved and executed by the CPU 102, renders executable functions relating to an input and output of the remote control 106, and the basic functions of the computer, which is the node apparatus 1, such as a memory management of the first memory 103, the second memory 104, and the like. Then, in a condition in which the OS program 114 is executed by the CPU 102, the heretofore described screen control program 115, stream control program 116, message monitoring program 117, routing control program 118, player program 119, and the like, are retrieved from the first memory 103, and executed.

It is also acceptable that the OS program 114, screen control program 115, stream control program 116, message monitoring program 117, routing control program 118, player program 119, and the like are, for example, downloaded via the network interface 105 into the first memory 103 from a server, or the like, connected to the network 8, and it is also acceptable that, after being recorded on a recording medium such as a CD-ROM, they are loaded into the first memory 103 via a drive of the recording medium.

Second Memory 104

The second memory 104 has an area which stores a catalog list 122, in which contents introduced from the contents management apparatus 10, and provided in the contents distribution system S, are listed, contents data 123 and the like distributed from the contents management apparatus 10, and the like.

Controller 113

The controller 113, being configured, as heretofore described, of the CPU 102 and first memory 103, centrally controls a whole of the node apparatus 1 by the CPU 102 retrieving and executing the various kinds of program 114 to 119 stored in the first memory 103, as well as functioning as a display control section, a stream control section, a message destination determination section, a distribution source information selection section, a contents data distribution source information return section, a contents data distribution source information transmission request forwarding section, a contents data distribution source information reception section, a position information management section, an arrival time determination section, a position information return section, a management information proportion change section, an own node apparatus identification information calculation section, a contents identification information calculation section, a registration message generation section, a registration message transmission section, a message forwarding section, a decoding section, a contents reproduction section, and the like, to be described hereafter.

The controller 113 functions as the display control section by the CPU 102 executing the screen control program 115, also, as the stream control section and the like by the CPU 102 executing the stream control program 116, also, as the message destination determination section, the distribution source information selection section, the contents data distribution source information return section, the contents data distribution source information transmission request forwarding section, the contents data distribution source information reception section, the position information management section, the arrival time determination section, the position information return section, the management information proportion change section, the own node apparatus identification information calculation section, the contents identification information calculation section, the registration message generation section, the registration message transmission section, and the like, by the CPU 102 executing the message monitoring program 117, also, as the message forwarding section and the like by the CPU 102 executing the routing control program 118, also, as the decoding section, the contents reproduction section, and the like, by the CPU 102 executing the player program 119.

Display Control Section

The display control section has a function of controlling the video chip 109 and display 110, and displaying various kinds of image information (graphical information). That is, the display control section controls in what way an image is displayed on the display 110.

Stream Control Section

The stream control section has functions as a contents data reception section, which receives contents data stream distributed from another node apparatus 1, as a contents data distribution section, which stream distributes the contents data stored in the second memory 104 to another node apparatus 1, and the like.

The contents data reception section, when it is determined that packets distributed from another node apparatus 1 are contents packets, receives the contents packets one by one, and temporarily stores them in an unshown ring buffer of the first memory 103. Also, the contents data distribution section converts the contents data stored in the second memory 104 into contents packets, and transmits them one by one to another node apparatus 1 via the network interface 105. The contents data reception section and contents data distribution section, as well as being able to use a publicly known streaming distribution protocol, can also use a unique designated protocol.

Message Destination Determination Section

The message destination determination section, based on the destination identification information of a message received via the network 8 and on the routing table, determines whether or not the received message is addressed to its own node apparatus 1. A message determined by the message destination determination section is a heretofore described contents search message, registration message, distribution source information addition request message, distribution source information deletion request message, distribution source information acquisition request message, or the like.

The determination of whether or not the received message is addressed to its own node apparatus 1 is carried out by the controller 113, to be described hereafter, retrieving the destination node ID (the destination identification information) included in the message, and is based on the routing table stored in the first memory 103. That is, when receiving the various kinds of message via the network interface 105, the message destination determination section compares the destination identification information included in the received message with the node ID stored in the routing table and, in the event that it determines that the node ID in the routing table which is nearest the destination identification information included in the message is the node ID of its own node apparatus 1, determines that it is a message addressed to its own node apparatus 1.

Distribution Source Information Selection Section

In the event that it is determined by the message destination determination section that the message received via the network 8 is addressed to its own node apparatus 1, and that it is a contents search message, the distribution source information selection section selects either the first position information A or the second position information B from the index table. For example, as heretofore described, it selects either the index table of its own node apparatus or the index table of the external node apparatus, based on the arrival time of the contents search message transmitted by request node apparatus.

Contents Data Distribution Source Information Return Section

When the first position information A of the management information storage area of the index table 120 is selected by the distribution source information selection section, the contents data distribution source information return section returns the first position information A to the node apparatus 1 which has requested the contents data distribution source information, via the network 8.

When selecting the first position information A from the management information storage area of the index table 120, the contents data distribution source information return section selects first position information A of which an index table 120 introduction time column is the oldest, or which is empty (as it has not yet been introduced, there is no introduction time). By selecting the position information of a contents holding node apparatus with an old introduction time, or one which has not yet been introduced, in this way, it is possible to arrange in such a way that requests for contents data do not concentrate in one contents holding node apparatus.

Contents Data Distribution Source Information Transmission Request Forwarding Section In the event that the second position information B is selected by the distribution source information selection section, the contents data distribution source information transmission request forwarding section forwards a request, via the network 8, to transmit the contents data distribution source information, to a node apparatus 1 of which the second position information B is a location position. The forwarding of the request to transmit the contents data distribution source information is carried out, as heretofore described, by transmitting a distribution source information acquisition request message.

Contents Data Distribution Source Information Reception Section

The contents data distribution source information reception section receives a request from the management subject contents holding node apparatus, via the network 8, for a registration of the contents data distribution source information, including the position information of the management subject contents holding node apparatus.

Position Information Management Section

The position information management section, when position information of a management subject contents holding node apparatus to be newly stored arises, selects whether or not to hold the position information of the management subject contents holding node apparatus in the index table of its own node apparatus 1. Herein, the position information management section determines that position information of a management subject contents holding node apparatus to be newly stored has arisen when the contents data distribution source information reception section receives a request for a registration of the contents data distribution source information.

Also, the position information management section, when selecting to hold in the index table 120, stores the position information of the management subject contents holding node apparatus in the management information storage area of the index table 120. Meanwhile, when selecting not to hold in the index table of its own node apparatus 1, the position information management section transmits a request to the other node apparatus 1, via the network 8, to hold the management subject contents data distribution source information, including the position information of the management subject contents holding node apparatus, and stores the position information of the other node apparatus 1 in the extension management information storage area of the index table 120. The position information management section randomly decides on the node apparatus 1 to which to transmit the request to hold the management subject contents data distribution source information.

For example, in a condition in which a predetermined number of items of first position information A are stored in the management information storage area of the index table 120 (for example, in the case of the index table shown in FIG. 7, a condition in which 13 items of first position information A are stored), the position information management section, when position information of a management subject contents holding node apparatus to be newly stored arises, selects not to hold the position information of the management subject contents holding node apparatus in the index table 120.

Also, the position information management section, in a case of, according to the message destination determination section, receiving the first predetermined amount or more per unit time of contents search messages addressed to its own node apparatus 1, selects not to hold the position information of the management subject contents holding node apparatus in the index table 120.

Also, the position information management section, when receiving, via the network 8, a distribution source information addition request message, which is a request to hold the transmitted contents data distribution source information, in the event of determining that a predetermined number or more of items of third position information are stored in the non-management information storage area of the index table 120, further forwards the forwarded distribution source information addition request message to the other node apparatus 1, and stores the position information of the other node apparatus 1, as fourth position information, in the extension non-management information storage area of the index table 120.

Also, the position information management section, in a case of, according to the message destination determination section, not receiving the second predetermined amount or more per unit time of contents search messages addressed to its own node apparatus 1, as well as deleting at least one item of second position information B among the second position information B stored in the extension management information storage area of the index table 120, sends a request to the node apparatus 1 corresponding to the deleted second position information B to cancel the holding of the contents data distribution source information.

Arrival Time Determination Section

In the event that it is determined by the message destination determination section that the message received via the network 8 is addressed to its own node apparatus 1, and that it is a contents search message, the arrival time determination section determines whether or not a difference between the issuing time of the transmission request and the reception time of the transmission request is of a value less than a predetermined value. The determination is carried out based on the message issuing time included in the contents search message, and the reception time of the contents search message measured with an unshown clock section.

Position Information Return Section

In the event that it is determined by the arrival time determination section that the difference between the issuing time of the contents search message and the time at which the transmission request is received is of a value less than the predetermined value, the position information return section forwards the contents search message, as a distribution source information acquisition request message, to the node apparatus 1 having the second position information B stored in the non-management information storage area of the index table 120, while in the event that it is determined by the arrival time determination section that the difference between the issuing time of the contents search message and the time at which the transmission request is received is of a value equal to or greater than the predetermined value, the position information return section returns the first position information A stored in the management information storage area to the node apparatus which has transmitted the transmission request.

Management Information Proportion Change Section

The management information proportion change section changes the proportion of position information stored in the management information storage area and extension management information storage area of the index table 120. For example, in a case of, according to the message destination determination section, receiving a third predetermined amount or more per unit time of contents search messages addressed to its own node apparatus 1, the management information proportion change section changes the proportion of position information by increasing a capacity of the extension management information storage area of the index table 120, and reducing a capacity of the management information storage area.

Own Node Apparatus Identification Information Calculation Section

The own node apparatus identification information calculation section obtains a node ID, which is the identification information of its own node apparatus 1, by calculating an IP address, which is information unique to its own node apparatus, with a predetermined hash function.

Contents Identification Information Calculation Section

The contents identification information calculation section makes information unique to the contents data a contents ID, which is the identification information of the contents data, by calculating, in the way heretofore described, with a predetermined hash function identical to the one used in the own node apparatus identification information calculation section.

Registration Message Generation Section

The registration message generation section, when receiving the contents data from the root node apparatus, stores the contents data received in the second memory 104, which is the contents data storage section, and generates a registration message including the node ID and IP address of its own node apparatus.

Registration Message Transmission Section

The registration message transmission section, based on the contents ID of the contents data stored in the second memory 104, selects a transmission destination node apparatus from the identification information of the node apparatus stored in the routing table, and transmits the registration message generated by the registration message generation section. For example, in a case of having the kind of routing table shown in FIG. 4, and in which the contents ID of the contents data stored in the second memory 104 is "1231", the registration message transmission section selects the node ID "1221" from the routing table as the transmission destination node apparatus, and retrieves the IP address "21.13.21.13" of the node apparatus with the node ID "1221". Then, the registration message transmission section transmits the registration message, with the IP address "21.13.21.13" as the transmission destination node apparatus. The destination identification information of the registration message is "1231".

Message Forwarding Section

In the event that it is determined by the message destination determination section that a message received via the network 8 is not addressed to its own node apparatus, the message forwarding section, based on the destination identification information of the message received, retrieves the position information of a forwarding destination node apparatus from the routing table, and forwards the message received to the forwarding destination node apparatus.

Decoding Section

The decoding section decodes the contents data and the like transmitted from another node apparatus 1, in order to display them on the display 110, and output them from the built-in speaker 112. That is, the contents data transmitted from another node apparatus 1 being encoded by a streaming distribution data format, for example, a data format such as an ASF, a WMA or a WMV, the contents data encoded in this way are decoded in order that they can be displayed on the display 110, and output from the speaker 112.

Contents Reproduction Section

The contents reproduction section sequentially reproducing the contents data sequentially stored in a buffer area consisting of the ring buffer of the first memory 103, at this time, the contents data are reproduced by the controller 113 causing the video chip 109 and sound source chip 111 to operate based on the stream control program 116.

2.1 Description of Various Processes

Figure 15:
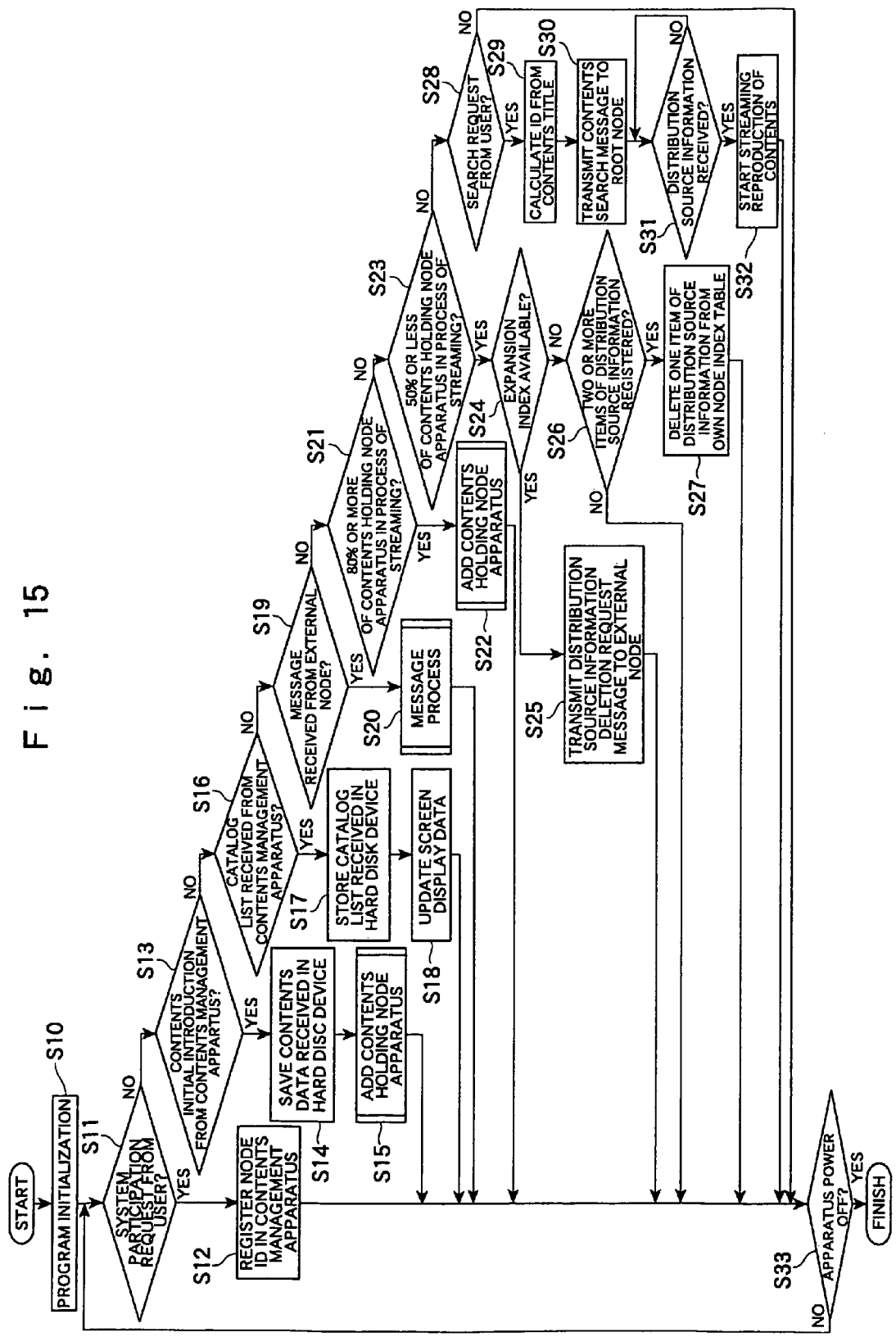
FIG. 15 is a flowchart showing a main process in the node apparatus.
Figure 16:
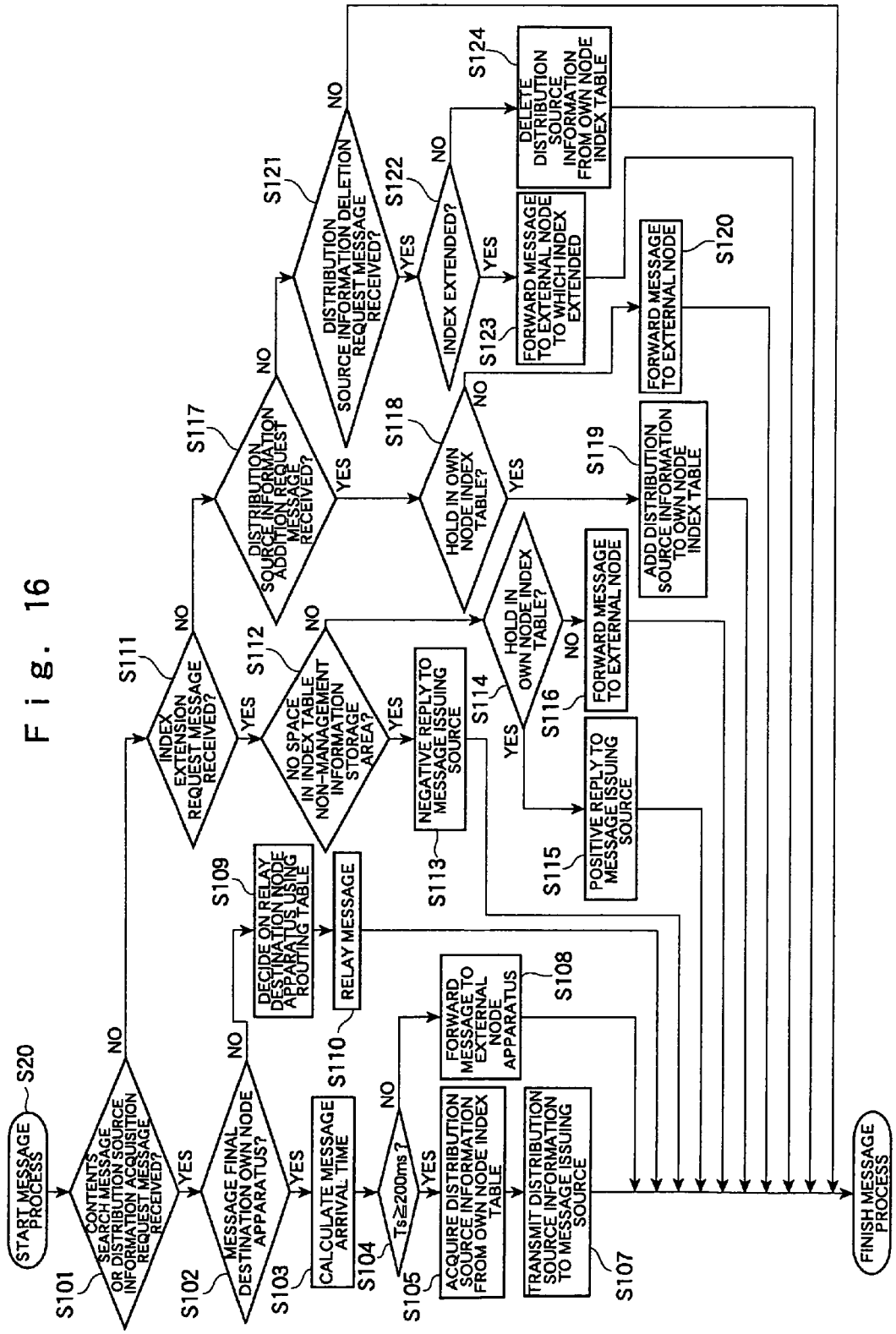
FIG. 16 is a flowchart showing a message process in the node apparatus.
Figure 17:
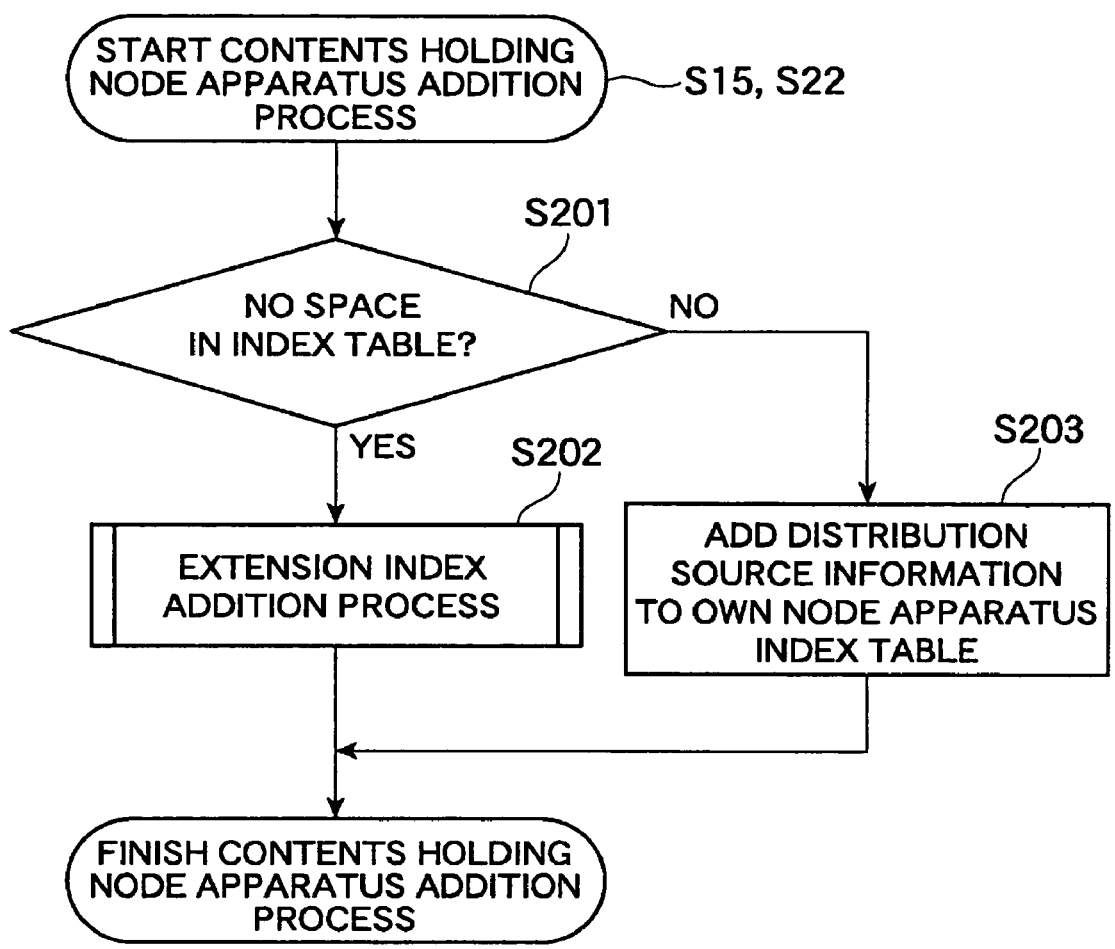
FIG. 17 is a flowchart showing a contents holding node apparatus addition process in the node apparatus.

Hereafter, a more specific description will be given, using the flowcharts of FIGS. 15 to 18, of detailed operations of the node apparatus 1. FIG. 15 is a flowchart showing a main process in the node apparatus 1, FIG. 16 is a flowchart showing a message process in the node apparatus 1, FIG. 17 is a flowchart showing contents holding node apparatus addition process, and FIG. 18 is a flowchart showing an index extension process.

Node Apparatus Main Process

As shown in FIG. 15, on power of the node apparatus 1 being turned on, the controller 113 carries out initial settings inside the node apparatus 1 by executing each program 114 to 119 (step S10).

Then, the controller 113 determines whether or not there is a request from a user of its own node apparatus 1 to participate in the contents distribution system S (step S11). For example, a contents distribution system S participation button being provided on the remote control 106, the controller 113 determines whether or not the user has requested to participate in the contents distribution system S depending on whether or not he or she has operated the participation button.

If it determines, in step S11, that there has been a request from the user to participate in the contents distribution system S (step S11: Yes), the controller 113 obtains a node ID, which is the identification information of its own node apparatus 1, by calculating the IP address, which is information unique to its own node apparatus, with a predetermined hash function, and transmits a participation request message, including the node ID and the IP address of its own node apparatus 1, to the contents management apparatus 10 (step S12). The contents management apparatus 10, on receiving the participation request message from the node apparatus 1, registers the node ID of the node apparatus 1 which has transmitted the participation request message, and causes it to participate in the contents distribution system S.

Also, if it determines, in step S11, that there has been no request from the user to participate in the contents distribution system S (step S11: No), the controller 113 determines whether or not there has been a contents initial introduction from the contents management apparatus 10 (step S13). The contents initial introduction is carried out by contents which are to be a management subject when its own node apparatus 1 becomes a root node apparatus, that is, management subject contents data, being received from the contents management apparatus 10.

If it determines that there has been a contents initial introduction from the contents management apparatus 10 (step S13: Yes), the controller 113 stores the management subject contents data received from the contents management apparatus 10 in a contents data storage area in the second memory 104, and holds them (step S14). Subsequently, the controller 113 carries out the "contents holding node apparatus addition process", to be described hereafter (step S15).

If it determines, in step S13, that there is no contents initial introduction from the contents management apparatus 10 (step S13: No), the controller 113 determines whether or not a catalog list has been received from the contents management apparatus 10 (step S16). The catalog list being a list of contents provided in the contents distribution system S, the user of the node apparatus can select desired contents using the catalog list.

If a catalog list is received from the contents management apparatus 10 (step S16: Yes), the controller 113 stores the catalog list received in a catalog list storage area of the second memory 104, and holds it (step S17). Then, the controller 113, based on the catalog list stored in step S17, generates contents selection screen data for displaying on the display 110, and updates screen display data (step S18).

Meanwhile, when no catalog list is received from the contents management apparatus 10 (step S16: No), the controller 113 determines whether or not it has received a message from an external node apparatus 1 via the network interface 105 (step S19). Then, if it determines that it has received a message from an external node apparatus 1 (step S19: Yes), the controller 113 carries out the "message process", to be described hereafter (step S20).

Also, if it determines, in step S19, that it has received no message from an external node apparatus 1 (step S19: No) the controller 113, based on a distribution time column of the index table 120, determines whether or not a proportion of the contents holding node apparatus accounted for by contents holding node apparatus currently in the process of distributing contents data (hereafter called a "distribution rate") is 80% or more (step S21). If it determines that the distribution rate is 80% or more (step S21: Yes), the controller 113 carries out the "contents holding node apparatus addition process", to be described hereafter (step S22).

Meanwhile, if the distribution rate is not 80% or more (step S21: No), the controller 113 further determines whether or not the distribution rate is 50% or less (step S23). If it determines that the distribution rate is 50% or less (step S23: Yes), the controller 113 further determines whether or not second position information B is stored in the extension management information storage area of the index table 120, that is, whether or not the extension index is available (step S24). If the extension index is available (step S24: Yes), the controller 113 transmits a distribution source information deletion request message to the external node apparatus 1 which is functioning as the extension index of its own node apparatus 1 (step S25). Meanwhile, if it determines that the extension index is not available (step S24: No), the controller 113 checks the number of items of first position information A registered in the management information storage area of the index table 120 (step S26) and, if the number of items of first position information A registered is two or more (step S26: Yes), it deletes one item of first position information A from the index table 120 of its own node apparatus 1 (step S27). If the number of items registered is less than two (step S26: No), the controller 113 does not delete any first position information A. In step S26, when deleting first position information A from the index table 120 of its own node apparatus 1, the controller 113 transmits a contents data deletion request to the corresponding contents holding node apparatus.

If it determines, in step S23, that the distribution rate is greater than 50% (step S23: No), the controller 113 determines whether or not there is a search request from the user (step S28). For example, displaying on the display 110 a catalog list in which are listed contents usable in the contents distribution system S, the controller 113 determines whether or not there is a search request from the user depending on whether or not contents have been selected from the catalog list by means of an operation of the remote control 106.

If it determines that there has been a search request from the user (step S28: Yes), the controller 113, by calculating a title of the contents for which there has been a search request with a predetermined hash function, obtains a contents ID, which is the identification information of the contents data (step S29). Then, the controller 113 generates a contents search message with the contents ID obtained in this way as the destination identification information, and transmits the generated contents search message via the network interface 105 (step S30). The transmission of the contents search message is carried out by, based on the routing table 121 stored in the first memory 103, retrieving the IP address of the transmission destination node apparatus 1, and transmitting the contents search message to the IP address. Subsequently, the controller 113 waits for a reply from a root node apparatus, or the like, corresponding to the destination identification information of the contents search message (step S31). If it receives the contents data distribution source information from the root node apparatus, or the like (step S31: Yes), the controller 113 sends a contents transmission request message, with the position information of the contents holding node apparatus included in the contents data distribution source information received as the destination, via the network interface 105 and, every time it receives a contents packet from the contents, holding node apparatus, retrieves the contents data from the contents packet received, sequentially stores them in the buffer area consisting of the ring buffer of the first memory 103, and sequentially reproduces the contents data temporarily stored in the ring buffer in this way (step S32).

When the processes of steps S12, S15, S18, S20, S22, S25, S27 and S32 are finished, or when it is determined in step S26 that the number of items of first position information A registered is not two or more (step S26: No), or when it is determined in step S28 that there is no search request from the user (step S28: No), the controller 113 determines whether or not the power of its own node apparatus 1 is turned off (step S33). When the power is not turned off (step S33: No), the controller 113 shifts to the process of step S11, while when the power is turned off (step S33: Yes), the controller 113 finishes the process.

Message Reception Process

Next, a specific description will be given, referring to FIG. 16, of the message process in step S20.

The controller 113 determines whether or not the message received from the external node apparatus 1 is a predetermined message, that is, a contents search message, or a distribution source information acquisition request message (step S101).

If it receives a predetermined message (step S101: Yes), the controller 113 further determines whether or not a final destination of the message received is its own node apparatus 1 (step S102). Whether or not the final destination of the message received is its own node apparatus 1 is determined based on the destination identification information of the message received and the routing table. That is, the controller 113 compares the destination identification information included in the message received with the node ID's stored in the routing table and, if it determines that the node ID in the routing table which is nearest to the destination identification information included in the message is the node ID of its own node apparatus 1, it determines that it is a message addressed to its own node apparatus 1.

If it determines that the final destination of the message received is its own node apparatus 1 (step S102: Yes), the controller 113 calculates the difference between the issuing time of the message received and the time at which the message has been received, that is, the arrival time Ts (step S103). The issuing time of the message received being inserted in the message by the node apparatus 1 which transmits the message, the controller 113 detects the issuing time of the message by referring to the issuing time in the message received.

Next, the controller 113 determines whether or not the arrival time Ts of the message received is 200 ms or more (step S104). If it determines that the arrival time Ts is 200 ms or more (step S104: Yes), the controller 113 retrieves one item of the first position information A stored in the management information storage area of the index table 120, acquires the contents data distribution source information including the first position information A (step S105), and transmits the contents data distribution source information acquired in this way to the node apparatus 1 which has transmitted the predetermined message (step S107). Meanwhile, if it determines that the arrival time Ts is less than 200 ms (step S104: No), the controller 113 forwards the predetermined message received to an external node apparatus 1 having second position information B stored in the non-management information storage area of the index table 120 (step S108). However, in step S108, in the event that there is no second position information B stored in the non-management information storage area, the controller 113 retrieves one item of the first position information A stored in the management information storage area of the index table 120, acquires the contents data distribution source information including the first position information A, and transmits the contents data distribution source information acquired in this way to the node apparatus 1 which has transmitted the predetermined message.

Also, if it determines, in step S102, that the final destination of the message received is not its own node apparatus (step S102: No), the controller 113, based on the routing table 121 stored in the first memory 103, decides on a forwarding destination of the message received (step S109), and relays the message by forwarding the message to the forwarding destination (relay destination) node apparatus 1 decided on (step S110).

If it determines, in step S101, that the message received is not a predetermined message (step S101: No), the controller 113 determines whether or not it has received an index extension request message (step S111). If it receives an index extension request message (step S111: Yes), the controller 113 determines whether or not there is space in the non-management information storage area of the index table 120, that is, whether or not there is an area in which to newly store third position information (step S112).

If there is no space in the non-management information storage area of the index table 120 (step S112: Yes), the controller 113 returns a negative reply, that is, a reply to the effect that the index extension is not possible, to the node apparatus which has transmitted the index extension request message (step S113). Meanwhile, if there is space in the non-management information storage area of the index table 120 (step S112: No), the controller 113 determines whether or not to hold in the non-management information storage area of the index table 120 in its own node apparatus (step S114). If it determines to hold in the non-management information storage area of its own node apparatus (step S114: Yes), the controller 113 returns a positive reply, that is, a reply to the effect that the index extension is possible, to the node apparatus which has transmitted the index extension request message (step S115). Meanwhile, if it determines not to hold in the non-management information storage area of its own node apparatus (step S114: No), the controller 113 forwards the index extension request message received to an external node apparatus (step S116).

If, in step S111, it does not receive an index extension request message (step S111: No), the controller 113 determines whether or not it has received a distribution source information addition request message (step S117).

If it receives a distribution source information addition request message (step S117: Yes), the controller 113 determines whether or not to hold in the non-management information storage area of the index table 120 in its own node apparatus (step S118). If it determines to hold in the non-management information storage area of its own node apparatus (step S118: Yes), the controller 113 stores the contents data distribution source information, included in the distribution source information addition request message received, in the index table of its own node apparatus 1. For example, the controller 113 adds third position information by storing the position information of the contents holding node apparatus, included in the distribution source information addition request message received, in the non-management information storage area of the index table of its own node apparatus 1 (step S119). Meanwhile, if it determines not to hold in the non-management information storage area of its own node apparatus (step S118: No), the controller 113 forwards the distribution source information addition request message received to an external node apparatus (step S120).

Also, when it does not receive a distribution source information addition request message (step S117: No), the controller 113 determines whether or not it has received a distribution source information deletion request message (step S121).

If it receives a distribution source information deletion request message (step S121: Yes), the controller 113, furthermore, determines whether or not it has extended the index table 120 of its own node apparatus 1 (step S122). Then, if it determines that it has extended the index table 120 of its own node apparatus 1 (step S122: Yes), the controller 113 forwards the distribution source information deletion request message to the external node apparatus 1 to which the index has been extended (step S123). In step S123, in the event that it is storing a plurality of external node apparatus 1 to which the index has been extended, the controller 113 randomly selects one external node apparatus 1, and forwards the distribution source information deletion request message to the selected external node apparatus 1. Meanwhile, if it determines that it has not extended the index table 120 of its own node apparatus 1 (step S122: No), the controller 113 deletes one item of third position information from the non-management information storage area of the index table 120 of its own node apparatus 1 (step S124). In step S124, in the event that it is storing a plurality of items of third position information in the non-management information storage area, the controller 113 randomly selects one item of third position information, and deletes the selected item of third position information.

When the processes of steps S107, S108, S110, S113, S115, S116, S119, S120, S123 and S124 are finished, or when it has determined, in step S121, that it has not received a distribution source information deletion request message (step S121: No), the controller 113 finishes the message process.

In steps S121 to S124, it has been arranged in such a way that the controller 113, determining whether or not it has extended the index table of its own node apparatus, forwards the distribution source information deletion request message in the event that it has extended the index table, and deletes one item of third position information from the non-management information storage area of the index table of its own node apparatus in the event that it has not extended the index table, but it is also acceptable to arrange to control in the following way.

For example, a control is done by the controller 113 in such a way that, determining whether or not third position information which is a deletion subject exists in the non-management information storage area of the index table of its own node apparatus, when third position information which is a deletion subject exists in the non-management information storage area, the controller 113 deletes the third position information which is the deletion subject from the non-management information storage area of the index table of its own node apparatus, while in the event that it determines that there is no third position information which is a deletion subject, the controller 113 forwards the distribution source information deletion request message to the external node apparatus to which the index has been extended.

Contents Holding Node Apparatus Addition Process

Next, a specific description will be given, referring to FIG. 17, of the contents holding node apparatus addition process in steps S15 and S22.

The controller 113, firstly, retrieves the management subject contents data stored in the second memory 104, and transmits them to the node apparatus which is to become the contents holding node apparatus. The node apparatus which is to become the contents holding node apparatus is randomly decided on by the controller 113. That is, the controller 113 obtains a random value by means of a random calculation, calculates the random value with a predetermined hash function, and makes this the node ID of the node apparatus which is to become the contents holding node apparatus. Then, the controller 113 transmits a contents data holding request and the contents data to the node apparatus decided on, causing it to hold the management subject contents data. In the case of generating the contents holding node apparatus with the controller 113 in the heretofore described way, as the controller 113 knows the contents ID and distribution time of the management subject contents data, or the node ID of the contents holding node apparatus, it acquires the contents data distribution source information by causing only a location position of the contents holding node apparatus to be transmitted, as a registration message, from the contents holding node apparatus.

On receiving a registration message from the node apparatus decided on indicating that it holds the management subject contents data, next, the controller 113 determines whether or not there is space in the management information storage area of the index table 120, that is, whether or not there is an area in which to newly store first position information (step S201).

If it determines that there is no space in the management information storage area of the index table 120 of its own node apparatus 1 (step S201: Yes), the controller 113 carries out the "index extension process", to be described hereafter (step S202). Meanwhile, if it determines that there is space in the management information storage area of the index table 120 of its own node apparatus 1 (step S201: No), the controller 113 stores the position information of an added contents holding node apparatus, as first position information, in the management information storage area of the index table 120 (step S203). On the processes of steps S202 and S203 finishing, the controller 113 finishes the contents holding node apparatus addition process.

Index Extension Process

Next, a specific description will be given, referring to FIG. 18, of the index extension process in step S202.

Firstly, the controller 113, in order to extend the index table, randomly decides on an external node apparatus for extending the index table . . . . That is, the controller 113 obtains a random value by means of a random calculation, calculates the random value with a predetermined hash function, and makes this the node ID of the node apparatus which is to become the transmission destination (step S301). Next, the controller 113 transmits an index extension request message to the node apparatus having the node ID (step S302).

Subsequently, the controller 113 waits a predetermined time for a reply from the external node apparatus (step S303). If there is a reply from the external node apparatus within the predetermined time, the controller 113 determines whether or not the reply is a positive reply, that is, whether or not it receives a response to the effect that the extension of the index table is possible (step S304). If it receives a positive reply from the external node apparatus, the controller 113 transmits a distribution source information addition request message to the external node apparatus (step S305), and finishes the index extension process. Meanwhile, if it receives a negative reply from the external node apparatus, that is, a response to the effect that the extension of the index table is not possible (step S304: No), the controller 113 returns to the process of step S301 and, transmitting the index extension request message again to an external node apparatus having another node ID, continues carrying out the process until the extension of the index table is possible.

In the above way, the node apparatus in the contents distribution system S in the embodiment, when functioning as the root node apparatus, that is, when receiving a contents search message addressed to the node apparatus itself via the network, selects either the first position information or the second position information from the routing table. When selecting the first position information, the node apparatus returns the first position information to the node apparatus which has transmitted the contents search message, while when selecting the second position information, it transmits a distribution source information acquisition request message to the node apparatus of the second position information. Consequently, it being possible to use the information storage area of the external node apparatus, even a node apparatus with a small storage capacity, such as in the case of a set-top box, can function as the root node apparatus.

In the embodiment, it has been arranged in such a way that, when selecting the second position information, the controller 113 transmits a distribution source information acquisition request message to the node apparatus of the second position information but, not being limited to this, it is also acceptable to arrange in such a way that, for example, the controller 113 forwards the contents search message. That is, as long as it is arranged in such a way that a "contents data distribution source information transmission request" from the node apparatus, or information on the matter, is forwarded, it can be transmitted in any kind of way.

Furthermore, in the embodiment, the root node apparatus gives an instruction for a generation of a contents node holding apparatus but, in a kind of case in which the root node apparatus does not decide on the node apparatus which is to be the contents holding node apparatus, such as a kind of case in which the contents management apparatus 10 decides on the node apparatus which is to be the contents holding node apparatus, and distributes the management subject contents data, or a kind of case in which the node apparatus, when viewing or listening to the contents, downloads the contents data and becomes the contents holding node apparatus, it is also acceptable to take the reception of a registration message from the node apparatus which has become the contents holding node apparatus as the occurrence of a distribution source information addition event. In this case, the node apparatus 1, when functioning as the root node apparatus, has the contents data distribution source information reception section, which receives a registration message (a contents data distribution source information registration request), including the position information of the management subject contents holding node apparatus, from the management subject contents holding node apparatus via the network 8 and, when the contents data distribution source information reception section receives the registration message, it is determined that position information of a management subject contents holding node apparatus to be newly stored has arisen.

Furthermore, although the occurrence of a distribution source information addition event has been when a registration message is received, in the case in which the root node apparatus causes the generation of a contents holding node apparatus, as in the embodiment, it is also acceptable to cause a distribution source information addition event to occur when generating a contents holding node apparatus.

Furthermore, in the embodiment, it has been taken that a distribution source information addition request message is transmitted from the root node apparatus to the external node apparatus in order to extend the index table but, in the kind of case in which the contents management apparatus 10 decides on the node apparatus which is to be the contents holding node apparatus, and distributes the management subject contents data, it is also acceptable to make a registration message from the node apparatus which has become the contents holding node apparatus a distribution source information addition request message by forwarding it as it is.

Furthermore, in the embodiment, a description has been given with the IP address of the contents holding node apparatus as an example of the position information in the contents data distribution source information stored in the index table but, as the position information of the contents holding node apparatus, it is also acceptable to make the identification information, such as the node ID of the contents holding node apparatus, the position information, rather than the IP address.

Also, the invention is not limited to the heretofore described embodiment. The heretofore described embodiment being illustrative, an embodiment having a configuration essentially identical to a technical idea described in the claims of the invention, and having the same effect, comes within the technical scope of the invention in any and every case.

Also, all disclosures of Japanese Patent Application (No. 2006-011889), filed on Jan. 20, 2006, including the description, the claims, the drawings and the abstract, are incorporated herein by reference.

What is claimed is:

1. A node apparatus in a contents distribution system which, being configured of a plurality of node apparatus disposed dispersed in a network, carries out a transmission and reception of contents data among the node apparatus, the node apparatus comprising:

a routing table storage section which stores a routing table in which are correlated identification information and position information of one portion of node apparatus among the plurality of node apparatus;

a message destination determination section which, based on destination identification information of a message received via the network and on the routing table, determines whether or not the message received is addressed to its own node apparatus;

a message forwarding section which, in the event that it is determined by the message destination determination section that a message received via the network is not addressed to its own node apparatus, based on the destination identification information of the message received, retrieves the position information of a forwarding destination node apparatus from the routing table, and forwards the message received to the forwarding destination node apparatus;

a distribution source information storage section which has a management information storage area storing first position information, which is position information of a management subject contents holding node apparatus which holds contents data which are a subject of management in its own node apparatus, and an extended management information storage area storing second position information, which is position information of a node apparatus holding the position information of the management subject contents holding node apparatus;

a distribution source information selection section which, in the event that it is determined by the message destination determination section that a message received via the network is addressed to its own node apparatus, and that it is a request for a transmission of contents data distribution source information, selects either the first position information or the second position information from the distribution source information storage section;

a contents data distribution source information return section which, when the first position information is selected by the distribution source information selection section, returns the first position information to a node apparatus which has requested the contents data distribution source information, via the network; and a contents data distribution source information transmission request forwarding section which, when the second position information is selected by the distribution source information selection section, forwards a request, via the network, to transmit the contents data distribution source information to a node apparatus of the second position information.

2. The node apparatus according to claim 1, further comprising:

a position information management section which, when position information of a management subject contents holding node apparatus to be newly stored arises, selects whether or not to hold the position information of the management subject contents holding node apparatus in the distribution source information storage section, wherein the position information management section, when selecting to hold in the distribution source information storage section, stores the position information of the management subject contents holding node apparatus in the management information storage area, while when selecting not to hold in the distribution source information storage section, the position information management section transmits a request to the other node apparatus, via the network, to hold the management subject contents data distribution source information, including the position information of the management subject contents holding node apparatus, and stores position information of the other node apparatus in the extension management information storage area.

3. The node apparatus according to claim 2, further comprising:
a contents data distribution source information reception section which receives a request from the management subject contents holding node apparatus, via the network, for a registration of the contents data distribution source information, including the position information of the management subject contents holding node apparatus, wherein
the position information management section determines that position information of a management subject contents holding node apparatus to be newly stored has arisen when the contents data distribution source information reception section receives a request for a registration of contents data distribution source information.

4. The node apparatus according to claim 2, wherein
the position information management section, when selecting not to hold in the distribution source information storage section, randomly decides on the node apparatus to which to transmit the request to hold the management subject contents data distribution source information.

5. The node apparatus according to claim 2, wherein
the position information management section, when position information of a management subject contents holding node apparatus to be newly stored arises in a condition in which a predetermined number of items of first position information are stored in the management information storage area, selects not to hold the position information of the management subject contents holding node apparatus in the distribution source information storage section.

6. The node apparatus according to claim 2, wherein
the position information management section, in a case of, according to the message destination determination section, receiving a first predetermined amount or more per unit time of requests addressed to its own node apparatus to transmit the contents data distribution source information, selects not to hold the position information of the management subject contents holding node apparatus in the distribution source information storage section.

7. The node apparatus according to claim 2, wherein
the distribution source information storage section has a non-management information storage area storing third position information, which is the position information of the management subject contents holding node apparatus forwarded from an external node apparatus, and an extension non-management information storage area storing fourth position information, which is position information of a node apparatus caused to hold the position information of the management subject contents holding node apparatus forwarded from the external node apparatus; and
the position information management section, when receiving, via the network, a request to hold the management subject contents data distribution source information, in the event of determining that a predetermined number or more of items of third position information are stored in the non-management information storage area, further forwards the request to the other node apparatus to hold the management subject contents data distribution source information, and stores the position information of the other node apparatus, as the fourth position information, in the extension non-management information storage area.

8. The node apparatus according to claim 2, wherein
the position information management section, in a case of, according to the message destination determination section, not receiving a second predetermined amount or more per unit time of requests addressed to its own node apparatus to transmit the contents data distribution source information, as well as deleting at least one item among the second position information stored in the extension management information storage area, sends a request to a node apparatus corresponding to the deleted second position information to cancel the holding of the contents data distribution source information.

9. The node apparatus according to claim 2, further comprising:
an arrival time determination section which, in the event that it is determined by the message destination determination section that a message received via the network is addressed to its own node apparatus, and that it is a request to transmit the contents data distribution source information, determines whether or not a difference between an issuing time of the transmission request and a time at which the transmission request is received is of a value less than a predetermined value; and
a position information return section which, in the event that it is determined by the arrival time determination section that the difference is of a value less than the predetermined value, forwards the transmission request to the node apparatus having the second position information stored in the extension management information storage area, while in the event that it is determined by the arrival time determination section that the difference is of a value equal to or greater than the predetermined value, it returns the first position information stored in the management information storage area to the node apparatus which has transmitted the transmission request.

10. The node apparatus according to claim 1, further comprising:
a management information proportion change section which changes a proportion of the position information stored in the management information storage area and extension management information storage area.

11. The node apparatus according to claim 10, wherein
the management information proportion change section, in a case of, according to the message destination determination section, receiving a third predetermined amount or more per unit time of requests addressed to its own node apparatus to transmit the contents data distribution source information, changes the proportion of the position information by increasing the second position information stored in the extension management information storage area.

12. A non-transitory computer-readable storage medium that stores a computer-executable program, the program causes a computer to function as each section of the node apparatus according to claim 1.

13. An information processing method in a node apparatus in a contents distribution system which, being configured of a plurality of node apparatus disposed dispersed in a network, carries out a transmission and reception of contents data among the node apparatus, the node apparatus including:
a routing table storage section which stores a routing table in which are correlated identification information and position information of one portion of node apparatus among the plurality of node apparatus; and a distribution source information storage section which has a management information storage area storing first position information, which is position information of a management subject contents holding node apparatus which holds contents data which are a subject of management in its own node apparatus, and an extended management information storage area storing second position information, which is position information of a node apparatus holding the position information of the management subject contents holding node apparatus;

the method comprising:

a message destination determination step which, based on destination identification information of a message received via the network and on the routing table, determines whether or not the message received is addressed to its own node apparatus;

a message forwarding step which, in the event that it is determined that a message received via the network is not addressed to its own node apparatus, based on the destination identification information of the message received, retrieves the position information of a forwarding destination node apparatus from the routing table, and forwards the message received to the forwarding destination node apparatus;

a distribution source information selection step which, in the event that it is determined that a message received via the network is addressed to its own node apparatus, and that it is a request for a transmission of contents data distribution source information, selects either the first position information or the second position information from the distribution source information storage section;

a contents data distribution source information return step which, when the first position information is selected by the distribution source information selection step, returns the first position information to a node apparatus which has requested the contents data distribution source information; and a contents data distribution source information transmission request forwarding step which, when the second position information is selected by the distribution source information selection step, forwards a request to transmit the contents data distribution source information to a node apparatus of the second position information.

* * * * *